United States Patent [19]

Narazaki et al.

[11] Patent Number: 5,355,065
[45] Date of Patent: Oct. 11, 1994

[54] ADAPTIVE CONTROL SYSTEM

[75] Inventors: Kazushige Narazaki, Neyagawa; Osamu Ito, Kadoma, both of Japan

[73] Assignee: Matsushita Electric Industrial Co., Ltd., Kadoma, Japan

[21] Appl. No.: 60,039

[22] Filed: May 11, 1993

Related U.S. Application Data

[63] Continuation of Ser. No. 673,977, Mar. 25, 1991, abandoned.

[30] Foreign Application Priority Data

Mar. 26, 1990 [JP] Japan .................................. 2-76058
Oct. 31, 1990 [JP] Japan .................................. 2-295731

[51] Int. Cl.$^5$ ............................................. G05B 13/00
[52] U.S. Cl. ................................... 318/632; 318/561; 318/601; 318/571; 318/631; 364/148; 364/165
[58] Field of Search ............... 318/566, 561, 564, 600, 318/631, 571, 601, 560–634; 364/148–166; 901/2, 9, 12, 18, 19, 20, 23

[56] References Cited

U.S. PATENT DOCUMENTS 4,998,051 3/1991 Ito .

OTHER PUBLICATIONS

Patent Abstracts of Japan, vol. 10, No. 308 (P. 508) (2364) Oct. 21, 1986.
Patent Abstracts of Japan, vol. 10, No. 135 (P.457) (2192) May 20, 1986.
Proceedings of the 1988 American Control Conference, vol. 2, Jun. 1988, Atlanta, US, pp. 904–911.
Osamu Ito et al., Time Delay Control for Systems with Unknown Control Disdtribution Matrices in the Proceedings of the 31st Japan Joint Automatic Control Conference pp. 361–362, Oct. 1988.

*Primary Examiner*—William M. Shoop, Jr.
*Assistant Examiner*—David Martin
*Attorney, Agent, or Firm*—Cushman, Darby & Cushman

[57] ABSTRACT

A control system for a physical plant has a state output detector for detecting operating conditions of the physical plant. A trajectory production unit produces desired operating conditions of the physical plant, and an error production unit produces error signals based on the detected operating conditions and the desired operating conditions. A control signal generator generates a control signal based on the detected operating conditions, the error signals, a control signal generated a predetermined time period ago, an error dynamics adjustment signal, and a control input signal. The control signal generator includes a control input signal generator and an error dynamics signal generator. The control input signal generator generates the control input signal based on a predetermined control relationship. The error dynamics adjustment signal generator generates the error dynamics adjustment signal and the predetermined time period based on a plurality of predetermined error dynamics relationships. A control signal applicator controls the physical plant in accordance with the generated control signal.

12 Claims, 13 Drawing Sheets

ADAPTIVE CONTROL SYSTEM

This is a continuation of application Ser. No. 07/673,977 filed on Mar. 25, 1991 which was abandoned upon the filing hereof.

FIELD OF THE INVENTION AND RELATED ART STATEMENT

1. Field of the Invention

The present invention relates to an adaptive control system for controlling a physical plant such as a servo motor or a heat pump of which dynamic property can not be estimated and/or extraneous disturbance can not be disregarded.

2. Description of the Related Art

In the prior art of the U.S. Pat. No. 4,998,051 by Osamu Ito who is one of the inventors of the present application, an example of an adaptive control system is disclosed. In the prior art, a physical plant in which an input distribution matrix "B" is known is described. Moreover, the inventor has disclosed a method for improving a Time Delay Controller (TDC) in the Proceeding of the 31th Japan Joint Automatic Control Conference (page 361-362). According to the method, in the event that an input distribution matrix "B" is unknown, the input distribution matrix "B" is estimated with respect to a single-input-single-output physical plant.

In the TDC, quick reduction of an error is contemplated. The error is defined by a difference between the output of the physical plant and a "desired trajectory" or the output of a reference model which are defined by a function of time with respect to the physical plant having an unknown property. The "desired trajectory" is defined by an aggregation of data which are given by a function of time and is a target of control in a physical plant. The aggregation of the data is distributed on a trajectory and hence is called the "desired trajectory".

In order for the output of the physical plant follow a desired trajectory, the value of an input distribution matrix "B" estimated in advance is calculated by dividing the variation of the differential value of the output by the variation of an input thereof. Then, in the TDC, an unknown dynamic property other than the input distribution matrix "B" is estimated by using a control input matrix "$B_{est}$", the input value at a predetermined time length "L" ago and the differential value of the output at the predetermined time length "L" ago. The dispersion of the estimated value of the input distribution matrix "B" is canceled in the control input matrix "$B_{est}$". Moreover, the error characteristic of the TDC is adjusted by using an error dynamics adjustment matrix "$K_i$". The control input matrix "$B_{est}$", time length "L" and error dynamic adjustment matrix "$K_i$" are called "design parameters".

According to the prior art of the U.S. Pat. No. 4,998,051, excellent robustness property against an unknown dynamic property and/or extraneous disturbance is realized in the event that the variation of an unknown input distribution matrix "B" is relatively small and slow.

However, in the TDC of the prior art, some drawbacks exists in view of practical use. Namely, the variation of a small input or a small differential value of an output which is close to zero is used in estimation off the value of an input distribution matrix "B" with respect to an physical plant. Consequently, the estimated value deviates from an actual value, and a control input matrix "$B_{est}$" having a high accuracy can not be obtained. In order to obtain the control input matrix "$B_{est}$" having the high accuracy, plural values estimated during a predetermined time length must be calculated by a predetermined process. Namely, the predetermined time length is required for calculation. Therefore, the influence of the unknown dynamic property can not be canceled in an on-line control of the TDC which can response to the practical use. Particularly, the control input matrix "$B_{est}$" having a high accuracy is not realizable in rapid variation of the input distribution matrix "B". Thus, the physical plant does not follow the desired trajectory, and in a worst case the TDC becomes unstable in the event that the input distribution matrix "B" is unknown.

On the other hand, in the event that a physical plant which has a large and rapid variation of unknown input distribution matrix "B" is controlled by using a constant control input matrix "$B_{est}$", and the input distribution matrix "B" varies, a method for determining a control input matrix "$B_{est}$" for stable operation is not disclosed in the prior art. Furthermore, even if the control input matrix "$B_{est}$" is determined, a determining method of a time length "L" and an error dynamics adjustment matrix "$K_i$" is not apparently disclosed to satisfy a "following-property".

OBJECT AND SUMMARY OF THE INVENTION

An object of the present invention is to provide an adaptive control system in which a control input matrix "$B_{est}$" and design parameters can be determined so that the output of a physical plant follows a desired trajectory with stable and excellent following-property in the physical plant of multi-input-multi-output having an unknown input distribution matrix "B".

In accordance with the present invention, an adaptive control system with respect to the physical plant of q-input-q-output having characteristic of p in number which are represented by an equation "$y(s) = (s^n I - A_{w,n-1} \cdot s^{n-1} - \ldots - A_{w,0})^{-1} B_w u(s)$", wherein a Laplace variable is defined as "s", q-dimensional output vector is defined as "y(s)", q-dimensional input vector is defined as "u(s)", unknown plant of q×q-dimensional matrix is defined as "$A_{w,i}$(w=1—p, i=n−1—0)", unknown input distribution matrix of q×q-dimension having "$B_w{}^{-1}$" is defined as "$B_w$" and q×q-dimensional unit matrix is defined as "I";

comprises:

trajectory production means for outputting a desired trajectory vector $y_d(t)$ of said output vector given by a function of time t and differential value "$dy_d(t)/dt$—$d^n y_d(t)/dt^n$" of said desired trajectory vector;

state output detection means for detecting the output vector y(t) of said physical plant and said differential value "$dy(t)/dt$—$d^n y(t)/dt^n$" of said output vector;

error value production means for outputting error vector e(t) defined as the equation "$e(t) = y_d(t) - y(t)$" and differential value "$de(t)/dt$—$d^{n-1}e(t)/dt^{n-1}$" of said error vector by using said desired trajectory vector which is output from said trajectory production means and the differential value of said desired trajectory vector and said output vector output from said state output detection means and the differential value of said output vector;

input calculation means for calculating said input vector u(t) by an equation "$u(t)=u(t-L)+B_{est}^{-1}$ [$-d^n y(t-L)/dt^n + d^n y_d(t)/dt^n + K_{n-1} \cdot d^{n-1} e(t)/dt^{n-1} + \ldots + K_0 \cdot e(t)$]" by using the differential value of said desired trajectory vector output from said trajectory production means, the differential value "$d^n y(t-L)/dt^n$" of said output vector which had output from said sate output detection means a time length "L" ago, said error vector output from said error value production means, the differential value of said error vector and preceding input vector "$u(t-L)$" by the time length "L" ago;

providing that a q×q-dimension error dynamics adjustment matrix is defined as "$K_i (i=n-1-0)$", the desired error dynamics is defined as equation "$d^n e(t)/dt^n = -K_{n-1} \cdot d^{n-1} e(t)/dt^{n-1} - \ldots -K_0 \cdot e(t)$", a time length being defined as "L" and a control input matrix is defined as "$B_{est}$";

means for selecting said control input matrix "$B_{est}$" in said input calculation means in a manner that entire coefficients with respect to "s" of the characteristic equation which is obtained by equation "$\det\{2B_{est} \cdot B_w^{-1} - I)Ls + 2I\}$" are positive;

means for selecting said error dynamics adjustment matrix and said time length "L" in a manner that entire conditions given by $L << 2/|2B_{est}B_w^{-1} \cdot A_{w,n-1} + K_{n-1}|_{max}$, $L << 2/|(2B_{est}B_w^{-1} - I)K_{n-1}|_{max}$, $L << |2K_i|_{min}/|2B_{est}B_w^{-1} \cdot A_{w,i-1} + K_{i-1}|_{max}$, $L << |2K_i|_{min}/|(2B_{est}B_w^{-1} - I)K_{i-1}|_{max}$, $L << 2/\omega_0$, $L << 2/\{|(B_{est}B_w^{-1} - I)|_{max} \omega_0\}$ are satisfied with respect to every "i" from n−1 to 1, providing that the minimum absolute value of component of a matrix "$2K_i$" with the exception of zero component of a matrix "$2K_i$ is defined as "$|2K_i|$ min", and the frequency range which is required for following-property of said desired trajectory is defined as "$\omega_0$"; and control input production means for applying said input vector u(t) which is output from said input calculation means to said physical plant.

While the novel features of the invention are set forth particularly in the appended claims, the invention, both as to organization and content, will be better understood and appreciated, along with other objects and features thereof, from the following detailed description taken in conjunction with the drawings.

Figure 1:
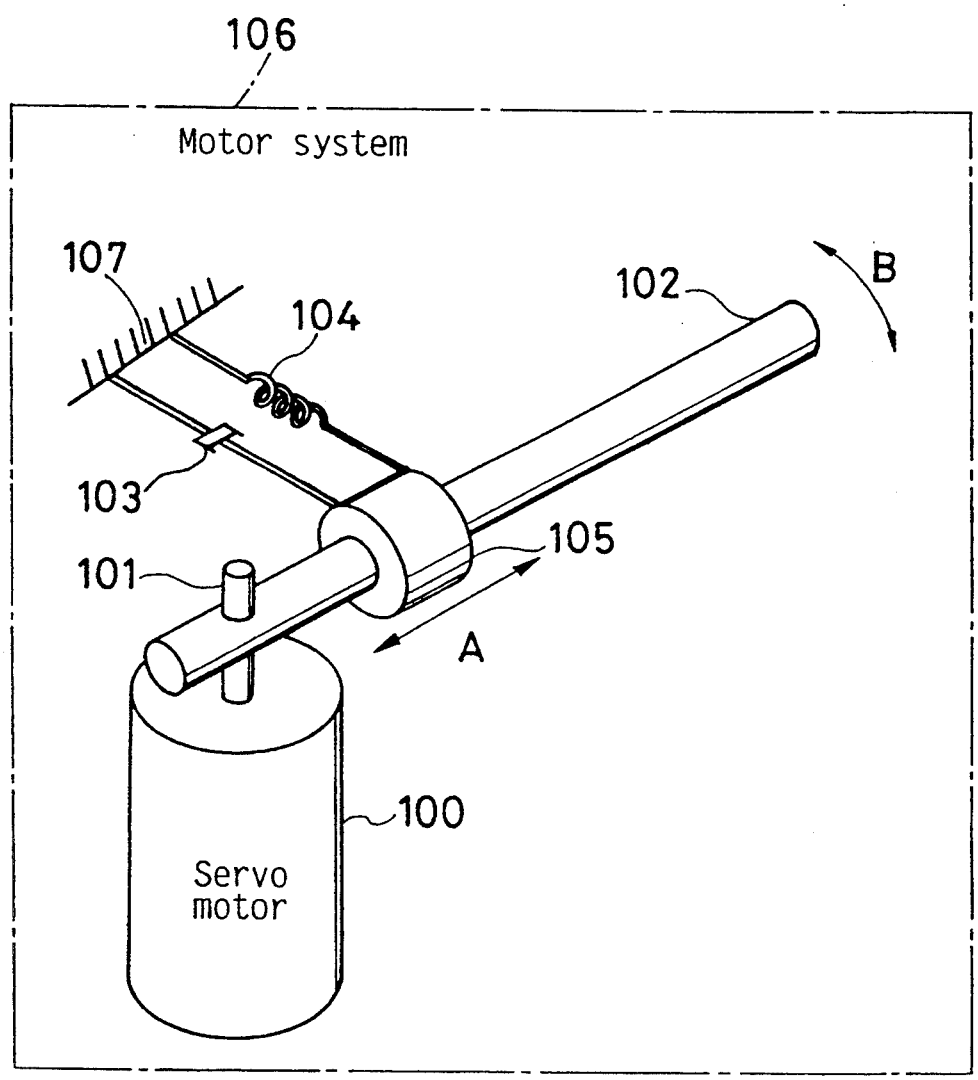
FIG. 1 is a perspective view of an example of a physical plant to which the adaptive control system of a first embodiment of the present invention is applied.

It will be recognized that some or all of the Figures are schematic representations for purposes of illustration and do not necessarily depict the actual relative sizes or locations of the elements shown.

DESCRIPTION OF THE PREFERRED EMBODIMENT

In a physical plant which is represented by a known "state space dynamics equation" given by $$X(t) = A(t) \cdot X(t) + B(t) \cdot u(t),$$

the function B(t) of time is called an input distribution matrix "B" and represents characteristics of the control system described by the above-mentioned state space dynamics equation. In a physical plant of single-input-single-output having an unknown input-distribution coefficient "$b_w$", a "first order lag system" of the single-input-single-output is simply represented by transfer function (1) as below:

$$G(s) = \frac{y(s)}{u(s)} = \frac{b_w}{s + a_w}. \tag{1}$$

An input distribution matrix "B" is represented by an input distribution coefficient "$b_w$" in transfer function form.

Then, a "desired error dynamics" with respect to the physical plant represented by the equation (1) is represented by equation (2), $$s \cdot e(s) + k \cdot e(s) = 0 \tag{2},$$

where, s: Laplace variable, w(w=0—p): characteristic at each operational point, $y_d(t)$: desired trajectory, and e(t): error between the desired trajectory $y_d(t)$ and an output y(t) defined by equation $e(t) = y_d(t) - y(t)$.

A control input u(t) which satisfies the equation (2) is calculated by equation (3) (see U.S. Pat. No. 4,972,57 of the prior art), $$u(t) = u(t-L) + \{-\dot{y}(t-L) + \dot{y}_d(t) + k \cdot e(t)\}/b_{est} \tag{3},$$

where, k: error dynamics adjustment coefficient, L: a time length of a periodic time of control, For example, and "$\dot{y}$" represents a differential value of "y".

A control input matrix in the physical plant of multi-input-multi-output is represented by "$B_{est}$", and a control input matrix in the physical plant of single-input-single-output is represented by "$b_{est}$". Suffix "est" represents estimation value. Then, variable ranges of the equation (1) is given by $$0 \leq a_{min} \leq a_w \leq a_{max}, \\ 0 < b_{min} \leq b_w \leq b_{max}, \\ 0 < k \qquad \qquad \qquad \}\quad (4)$$

A transfer function $y/y_d$ from the desired trajectory to the outputs of the physical plant is represented by equation (5) which is the combination of the equations (1) and (3), $$\frac{y}{y_d} = \frac{s + P_k(s)}{(b_{est}/b_w)(1 - e^{-Ls})P_p(s) + Se^{-Ls} + P_k(s)}, \quad (5)$$

where, $P_p(s) = s + a_w$, and thereby the term of the denominator of the equation (1) is represented. Moreover, the term $P_k(s)$ in the equation (5) is equal to an "error dynamic adjustment coefficient $k(P_k(s)=k)$", and the highest order term of the desired error dynamics is omitted.

In general, since the time length "L" is very small, the term $e^{-Ls}$ in the equation (5) is simplified by "Pade approximation" as shown in equation (6), $$e^{-Ls} = (2 - Ls)/(2 + Ls) \quad (6).$$

The equation (6) is substituted for the equation (5), and equation (7) is obtained, $$\frac{y}{y_d} = \frac{(Ls + 2)(s + P_k(s))}{A_2 s^2 + A_1 s + A_0}, \quad (7)$$

where, $$A_2 = \{2(b_{est}/b_w) - 1\}L \\ A_1 = \{2_a(b_{est}/b_w) + k\}L + 2 \\ A_0 = 2K \qquad \qquad \qquad \}\quad (8)$$

$$Q(s) = \{((2b_{est}/b_w) - 1)Ls + 2\}\{s + P_k(s)\} = B_2 s^2 + B_1 s + B_0 \quad (9),$$

where, $$B_2 = \{2(b_{est}/b_w) - 1\}L \\ B_1 = \{2(b_{est}/b_w) - 1\}k \cdot L + 2 \\ B_0 = 2K \qquad \qquad \qquad \}\quad (10)$$

When the time length "L" is within the ranges shown by relations (11) and (12), "$A_i$" is equal to "$B_i(i=2-0)$" within the ranges represented by the relation (4).

$$L << \frac{2}{\{2(b_{est}/b_{min}) - 1\}k}, \quad (11)$$

$$L << \frac{2}{2a_{max}(b_{est}/b_{min}) + k}. \quad (12)$$

Namely, when the relations (11) and (12) are satisfied, the polynomial of the denominator of the equation (7) can be substituted for the polynomial Q(s) shown by the equation (9). Then, the transfer function of the equation (7) (right term) is simplified as equation (13) because terms $\{s + P_k(s)\}$ in numerator and denominator are canceled.

$$\frac{y}{y_d} = \frac{Ls + 2}{\{2(b_{est}/b_w) - 1\}Ls + 2}. \quad (13)$$

Referring to the equation (13), within the range shown by the relation (4), condition of stability is to be a negative value in the real part of a pole of the equation (13), and thus the condition of stability is given by $$b_{est} > b_{max}/2 \quad (14).$$

The relation (14) is applied to the physical plant of single-input-single-output.

Moreover, the condition of following-property to the desired trajectory is given by $$L << 2/\omega_0 \quad (15),$$

$$L << 2/\{2(b_{est}/b_{min}) - 1\}\omega_0\} \quad (16).$$

Where, $\omega_0$: a desired frequency range for the following-property. In the physical plant shown by the equation (1), since the desired frequency range $\omega_0$ is equal to the error dynamic adjustment coefficient $k(\omega_0 = k)$ from the desired error dynamics shown by the equation (2), the relations (15), (16) are given by, respectively, $$L << 2/k \quad (17),$$

$$L << 2/\{2(b_{est}/b_{min}) - 1\}k\} \quad (18).$$

According to the equations (14) and (18), there is a trade-off relation between stability and following ability in determination of the design parameters of the control input coefficient "$b_{est}$". The stability and the following-property obtained as mentioned above are shown in FIG. 3.

Figure 3:
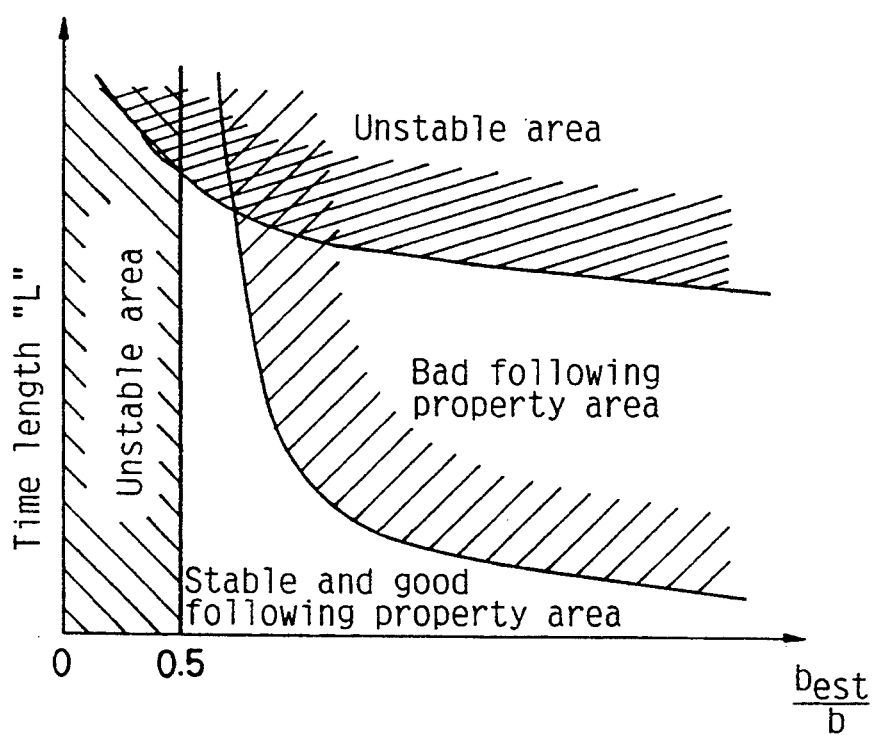
FIG. 3 is a diagram of the relation between a time length "L" and a control input coefficient "$b_{est}$"

Referring to FIG. 3, ordinate is graduated by the time length "L" and abscissa is graduated by the ratio of the control input coefficient "$b_{est}$" to the input distribution coefficient "b".

Referring to the relation (14), when the control input coefficient "$b_{est}$" is equal to the control input coefficient "$b_{max}$" as shown in the equation (19), $$b_{est} = b_{max} \quad (19),$$

and the condition of stability is simplified. Moreover, referring to the time length "L", the minimum value is selected from the ranges given by the equations which substitute the equation (19) for the relations (11), (12) and (17), respectively.

Subsequently, the adaptive control of a physical plant for a higher order lag system of q-input-q-output is described by using the above-mentioned result hereafter.

The physical plant is represented by the transfer function given by $$y(s) = (s^n I - A_{w,n-1} \cdot s^{n-1} - \ldots - A_{w,0})^{-1} \cdot B_w s(s) \quad (20).$$

Where,
$y = [y_1, \ldots, y_q]T$: output vector ($q \times 1$) of the physical plant
$A_{w,n-1}, \ldots, A_{w,0}$: unknown plant matrix
w: characteristic value (w=0—p) at each operational point $B_w$: input distribution matrix ($q \times q$)
$u = [u_1, \ldots, u_q]T$: input vector ($q \times 1$)
I: unit matrix ($q \times q$).

The TDC for calculating the input of the physical plant of multi-input-multi-output corresponding to the equation (3) is given by $$u(t) = u(t-L) + B_{est}^{-1} [-d^n y(t-L)/dt^n + d^n y_d(t)/dt^n + K_{n-1} \cdot d^{n-1} e(t)/dt^{n-1} + \ldots + K_0 \cdot e(t)]. \tag{21}$$

Where, $K_i (i=n-1-1)$: error dynamics adjustment matrix "$K_i$".

Relations of the higher order lag system corresponding to the relations (11)-(12) of the first order lag system of single-input-single-output are given by, respectively $$L << \frac{2}{|(2B_{est} \cdot B_w^{-1} \cdot A_{w,n-1}) + K_{n-1}|_{max}}, \tag{22}$$

$$L << \frac{2}{|(2B_{est} \cdot B_w^{-1} - I)K_{n-1}|_{max}}, \tag{23}$$

$$L << \frac{|2K_i|_{min}}{|(2B_{est} \cdot B_w^{-1} \cdot A_{i-1}) + K_{i-1}|_{max}}, \tag{24}$$

$$L << \frac{|2K_i|_{min}}{|(2B_{est} \cdot B_w^{-1} - I)K_{i-1}|_{max}}. \tag{25}$$

Where, $i = n-1-1$, $|2K_i|_{min}$: minimum absolute value of elements of matrix $2K_i$ except for "0".

When the relations (22)-(25) are satisfied, the equation corresponding to the equation (13) of the above-mentioned first order lag system of single-input-single-output is given by $$(L \cdot s + 2) I \cdot y_d \{(2B_{est} B_w^{-1} - I) L \cdot s + 2I\} \cdot y \tag{26}$$

In order to calculate a condition for satisfying stability of the system shown by the equation (26), the following characteristic equation S(s) is used, $$S(s) = \det\{(2B_{est} B_w^{-1} - I)L \cdot s + 2I\} \tag{27}.$$

"Routh's stability criterion" is applied to the characteristics equation S(s). In order to satisfy the stability shown by the equation (27), entire coefficients with respect to "s" must be positive. Hence, "necessary conditions" therefor are given by $$\Sigma\{\det(2B_{est} B_w^{-1} - I)\} < q > = \det(2 B_{est} B_w^{-1} - I) > 0 \tag{28-1}$$

$$\Sigma\{\det(2B_{est} B_w^{-1} - I)\} < q-1 > > 0 \tag{28-2},$$

$$\Sigma\{\det(2B_{est} B_w^{-1} - I)\} < q-2 > > 0 \tag{28-3},$$

$$\Sigma\{\det(2B_{est} B_w^{-1} - I)\} < 1 > = \text{trace}(2B_{est} B_w^{-1} - I) > 0 \tag{28-q}$$

Where, the left sides of the relations (28-1)-(28-q) represent ($j \times j$) dimensional minor matrixes. The minor matrix is formed in such a manner that first, an arbitrary row is selected from the matrix of the left side, then the column having the same number of the selected row is selected.

Moreover, conditions for representing following-property to a desired trajectory corresponding to the equations (15) and (16) of the first order lag system of single-input-single-output are given by $$L << 2/\omega_0 \tag{29},$$

$$L << 2/|(B_{est} B_w^{-1} - I)|_{max} \omega_0 \tag{30}.$$

The relations (28-1) and (30) express "trade-off relation" between stability and following-property in selection of the control input matrix "$B_{est}$" as a design parameter.

Hereafter, selection of the control input matrix "$B_{est}$" is elucidated in detail with respect to the physical plant of two-input-two-output. An input distribution matrix "$B_w$" and a control input matrix "$B_{est}$" are defined by equations (31) and (32), respectively.

$$B_w = \begin{vmatrix} b_{w,11}, & b_{w,12} \\ b_{w,21}, & b_{w,22} \end{vmatrix}, \tag{31}$$

$$B_{est} = \begin{vmatrix} b_{est,11}, & b_{est,12} \\ b_{est,21}, & b_{est,22} \end{vmatrix}. \tag{32}$$

Referring to the equations (31) and (32), unknown coefficients "$b_w$" of the input distribution matrix "$B_w$" are made to fulfill relation (33).

$$\det(B_w) = b_{w,11} \cdot b_{w,22} - b_{w,12} \cdot b_{w,21} > 0 \tag{33}.$$

The equation (27) is a quadratic expression of "s" in the event of two-input-two-output, and both relations (34) and (35) must be satisfied on the basis of the relations (28-1)-(28-q) as a "necessary and sufficient condition" of stability.

$$\det(2B_{est} B_w - 1 - I) > 0 \tag{34},$$

$$\text{trace}(2B_{est} B_w^{-1} - I) > 0 \tag{35}.$$

In order to simplify consideration, the sign of ($b_{w,11} - b_{w,22}$) is limited to a positive value as shown in relation (36), $$b_{w,11} - b_{w,22} > 0 \tag{36}.$$

The equations (31) and (32) are substituted for the relation (35) and are expanded. Then every component of the control input matrix "$B_{est}$" are bounded as given by $$\begin{aligned} 2b_{est,11} - b_{w,11} > 0, & \quad 2b_{est,12} - b_{w,12} \leq 0 \\ 2b_{est,21} - b_{w,21} \leq 0, & \quad 2b_{est,22} - b_{w,12} > 0 \end{aligned} \tag{37}$$

Consequently, the relation (35) is satisfied. The values of the components of the control input coefficient "$b_{est}$" ($b_{est,11}$, $b_{est,12}$, $b_{est,21}$, $b_{est,22}$) are in the trade-off relation between stability and following-property with each other. Therefore, in order to realize moderate stability, selection shown by relations (38) are recommended.

$$b_{est,11} = b_{w,11\text{-}max}, \quad b_{est,12} = b_{w,12\text{-}min}/2 \qquad (38)$$
$$b_{est,21} = b_{w,21\text{-}min}/2, \quad b_{est,22} = b_{w,22\text{-}max}$$

The equation (38) satisfies the equation (34).

Moreover, in the event that the relation (33) or the relation (36) is not satisfied, every components of the control input matrix "$B_{est}$" can be calculated. However, in the event that the sign of the matrix $\det(B_w)$ shown by the relation (33) is changed, the control input matrix "$B_{est}$" can not be determined. Namely, components of the control input matrix "$B_{est}$" are given by $$\left.\begin{array}{l} b_{est,11} = \text{sign}(b_{w,11})|b_{w,11}|_{max} \\ b_{est,12} = \text{sign}(b_{w,12})|b_{w,12}/2|_{max\ or\ min} \\ b_{est,21} = \text{sign}(b_{w,21})|b_{w,21}/2|_{max\ or\ min} \\ b_{est,22} = \text{sign}(b_{w,22})|b_{w,22}|_{max} \end{array}\right\}, \qquad (39)$$

where, "$\text{sign}(b_w)$" represents a sign of "$b_w$". Moreover, with respect to the terms "$|b_{w,12}/2|_{max\ or\ min}$" and "$|b_{w,21}/2|_{max\ or\ min}$" of the relation (39), the maximum value or the minimum value of "$b_w$" is selected in order that the absolute value of "$\det(B_{est})$" becomes maximum. For example, in the event that only "$b_{w,11}$" is negative in the equation (31), the control input matrix "$B_{est}$" is selected as shown by equation (40).

$$B_{est} = \begin{vmatrix} -|b_{w,11}|_{max}, & b_{w,12\text{-}max}/2 \\ b_{w,21\text{-}max}/2, & b_{w,22\text{-}max} \end{vmatrix} \qquad (40)$$

The time length "L" of two-input-two-output is calculated by substituting the control input matrix "$B_{est}$" for the relations (22)–(25), (29) and (30), and the time length "L" having the minimum value is selected.

In the physical plant of three-input-three-output or more, every components of the control input matrix "$B_{est}$" are selected in a manner that "$\det(B_{est})$" increases. Then, if the relations (28-1)–(28-q) are not satisfied, every components of the control input matrix "$B_{est}$" are changed in a manner that "$\det(B_{est})$" increases.

EXAMPLE OF CALCULATION

Stability of the control input matrix with respect to a physical plant of three-input-three-output is calculated by equations (41), (42), (43) and (44).

$$B_1 = \begin{vmatrix} 8.5 & 5.5 & 1.5 \\ 3.5 & 6.5 & 2.5 \\ 0.5 & 4.5 & 7.5 \end{vmatrix}, \qquad (41)$$

$$B_2 = \begin{vmatrix} 7.5 & 5.5 & 1.5 \\ 2.5 & 6.5 & 2.5 \\ 0.5 & 4.5 & 6.5 \end{vmatrix}, \qquad (42)$$

$$B_3 = \begin{vmatrix} 8.5 & 4.5 & 2.5 \\ 3.5 & 5.5 & 1.5 \\ 1.5 & 5.5 & 7.5 \end{vmatrix}, \qquad (43)$$

-continued $$B_{est} = \begin{vmatrix} 8.5 & 4.5 & 1.5 \\ 3.5 & 6.5 & 1.5 \\ 1.5 & 4.5 & 7.5 \end{vmatrix}. \qquad (44)$$

In the event that the input distribution matrix "B" varies as shown by the equations (41)–(43), the following three conditions are applied to the input distribution matrix "$B_1$" shown by the equation (41). These three conditions correspond to the equations (28-1)–(28-q).

The equation (41) is represented by the equation (45) by using the relation (28-1)–(28-q).

$$2B_{est} \cdot B_1^{-1} - I = \begin{vmatrix} 0.75 & -0.01 & 0.32 \\ -0.13 & 0.72 & 0.12 \\ -0.38 & 0.99 & 0.48 \end{vmatrix} \qquad (45)$$

Then the following conditions are examined with respect to $B_1$.

Condition 1

$$\det(2B_{est}B_1^{-1} - I) = 0.22 > 0 \qquad (46)$$

(Condition 2)

$$\det\begin{vmatrix} 0.75 & -0.01 \\ -0.13 & 0.72 \end{vmatrix} + \det\begin{vmatrix} 0.72 & 0.12 \\ 0.99 & 0.48 \end{vmatrix} + \qquad (47)$$

$$\det\begin{vmatrix} 0.75 & 0.32 \\ -0.38 & 0.48 \end{vmatrix} = 1.3 > 0$$

Condition 3

$$0.75 + 0.72 + 0.48 = 1.95 > 0 \qquad (48)$$

The conditions (1), (2) and (3) are satisfied because the values of these equations (46), (47) and (48) are positive values. Consequently, stable operation is realized in the physical plant which has the characteristic of the input distribution matrix "$B_1$".

In a manner similar to that described above, in the event that the conditions (1), (2) and (3) are also satisfied with respect to the equations (42) and (43), the physical plant having the characteristic which varies as shown by the input distribution matrixes "$B_1$", "$B_2$" and "$B_3$" is operated stably by using the input distribution matrix "$B_{est}$" given by the equation (44).

First Embodiment

FIG. 1 is a perspective view of a servo motor system 106 of a physical plant to which a first embodiment of the adaptive control system in accordance with the present invention is applied.

Referring to FIG. 1, a shaft 101 is rotated by a servo motor 100. A rod 102 is affixed on the shaft 101 and is arranged perpendicularly with respect to the revolution axis of the shaft 101. A load 105 is supported on the rod 102 and is movable along the rod 102 as shown by arrow A. The load 105 is connected to a stationary member 107 with intermediates of a damper 103 having viscid material therein and a spring 104. The load 105 receives a resistant force from the damper 103 and spring 104 by movement of the rod 102 in the direction shown by arrow B and by movement of the load 105 in the direction shown by arrow A. A "viscous resistance" of the damper is represented by "c", and a "spring constant" of the spring 104 is represented by "$K_s$. The rod 102 comprises a linear motor means, for example, and the load 105 is movable along the rod 102 during revolution of the shaft 101, the inertia of the motor system 106 is unknown.

Referring to the above-mentioned physical plant, the revolution angle of the shaft 101 is represented by "y(t)", and the input torque thereof is represented by "u(t)".

A differential equation for representing the action of the physical plant is given by $$J_w(d^2y/dt^2) + c\,(dy/dt) + k_s y = u \quad (49).$$

The Laplace transformation of the physical plant 106 represented by the equation (49) is given by $$G(s) = \frac{y(s)}{u(s)} = \frac{b_w}{s^2 + a_{w,1}\cdot s + a_{w,0}}, \quad (50)$$

where, $$a_{w,1} = c/J_w,\ a_{w,0} = k_s/J_w,\ b_w = 1/J_w \quad (51).$$

The equation (50) represents a transfer function G(s) in the event that an input distribution coefficient "$b_w$" is unknown and is varied.

The variable range of unknown characteristic "$a_{w,i}$" and the input distribution coefficient "$b_w$" are given by $$0 < a_{i\,min} \leq a_w, i \leq a_{i\,max}\ (i=1-2) \quad (52),$$

$$0 < b_{min} \leq b_w \leq b_{max} \quad (53).$$

Figure 2:
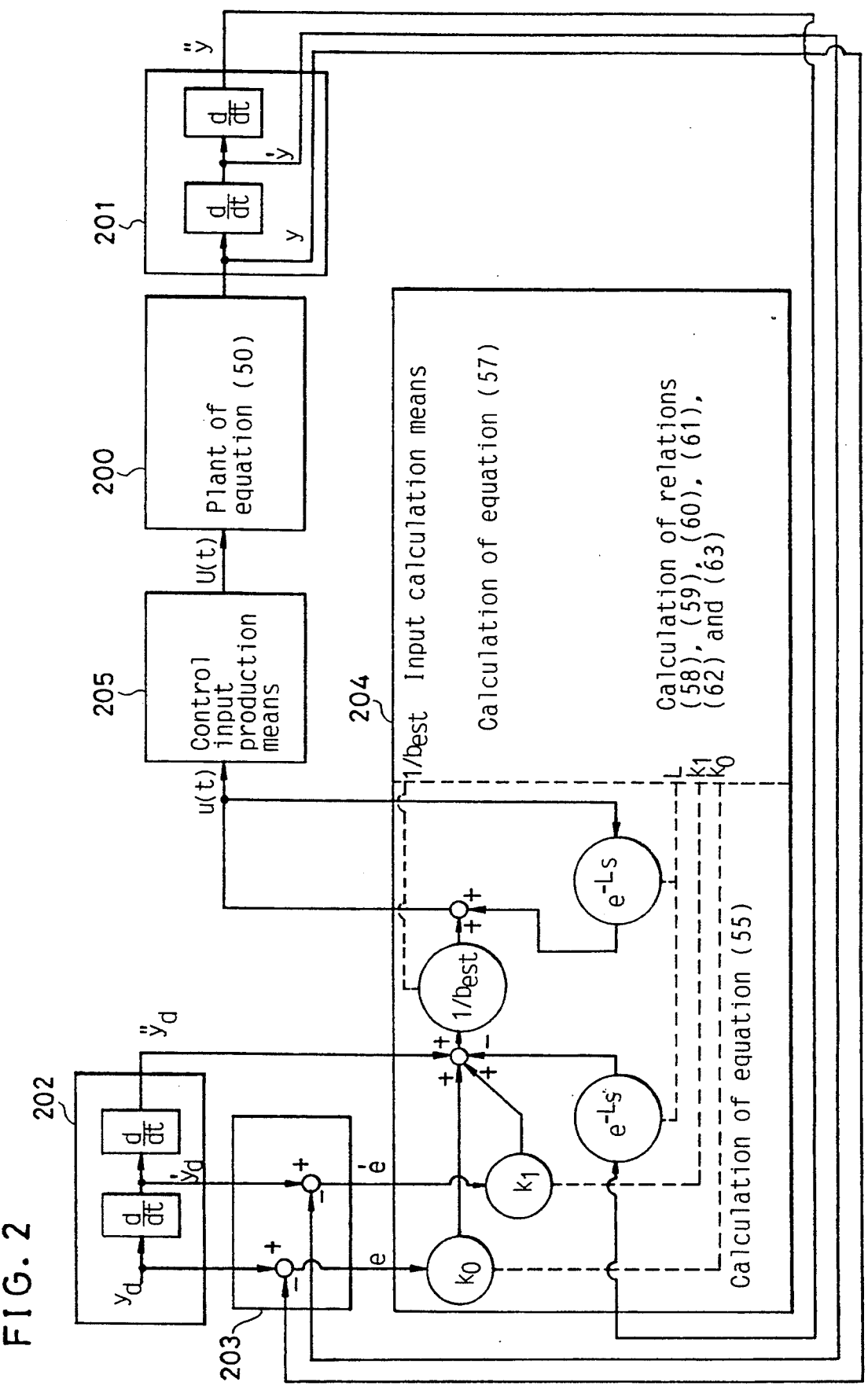
FIG. 2 is a block diagram of the adaptive control system of the first embodiment.

The block diagram of the adaptive control system of the first embodiment is shown in FIG. 2. Referring to FIG. 2, a physical plant 200 corresponds to the motor system 106 shown in FIG. 1. The revolution angle, angular velocity and angular acceleration of the physical plant 200 are detected by an output sensor 201 (called a state output detecting means) comprising an encoder, a tachometer, an acceleration sensor and a processing circuit therefor.

An arbitrary desired trajectory $y_d(t)$ of the angular acceleration of the function of time, differential values $\dot{y}_d(t)$ and $\ddot{y}_d(t)$ of the desired trajectory $y_d(t)$ are output from a trajectory production means 202.

The desired trajectory $y_d(t)$ and the differential value $\dot{y}_d(t)$ of the desired trajectory $y_d(t)$ are applied to an error value production means 203. In the error value production means 203, an output y(t) output from the state output detection means 201 and the differential value $\dot{y}(t)$ of the output y(t) are also applied to the error value production means 203, and calculation is performed on the basis of the equation (54).

$$e(t) = y_d(t) - y(t) \quad (54)$$

Consequently, en error e(t) and the differential value $\dot{e}(t)$ of the error e(t) are output therefrom.

The error e(t), the differential value $\dot{e}(t)$ and the second order differential value $\ddot{y}_d(t)$ of the output of the trajectory production means 202 are applied to an input calculation means 204. Moreover, an angle acceleration y(t−L) of the output of the state output detection means 201 which has detected a predetermined time length "L" ago is also inputted to the input calculation means 204. Then, calculation is performed on the basis of equation (55) by using an input u(t−L) which was input the time length "L" ago.

$$u(t) = u(t-L) + \{-\ddot{y}(t-L) + \ddot{y}_d(t) + k_1\cdot\dot{e}(t) + k_0\cdot e(t)\}/b_{est} \quad (55).$$

Consequently, a control input u(t) is output therefrom.

Referring to the equation (55), "$k_1$" and "$k_0$" represent "error dynamics adjustment coefficients", and "$b_{est}$" represents a "control input coefficient which is used to calculate the control input u(t).

A "desired error dynamics" which is represented by the following equation (56) is satisfied by these equations (50), (54) and (55):

$$\ddot{e}(t) + k_1\cdot\dot{e}(t) + k_0\cdot e(t) = 0 \quad (56).$$

Referring to the equation (55), the control input coefficient "$b_{est}$" is selected to satisfy the relation (14) as following equation (57):

$$b_{est} = b_{max} \quad (57).$$

Provided that the frequency band required for following-property of the desired trajectory is represented by "$\omega_0$", the time length L is selected to satisfy the following entire relations:

$$L << 2/\{2b_{est}/b_{min})-1)\cdot k_1\} \quad (58),$$

$$L << 2/\{2a_{1\cdot max}\cdot(b_{est}/b_{min}) + k_1\} \quad (59),$$

$$L << 2\cdot k_1/[\{2(b_{est}/b_{min})-1\}\cdot k_0] \quad (60),$$

$$L << 2\cdot k_1/(2a_{0\cdot max}\cdot(b_{est}/b_{min}) + k_0) \quad (61),$$

$$L << 2/\omega_0 \quad (62),$$

$$L << 2/\{2(b_{est}/b_{min})-1)\cdot\omega_0\} \quad (63).$$

Then, in the input calculation means 204, calculation is performed on the basis of the control input coefficient "$b_{est}$" and the time length "L". Consequently, the resultant control input u(t) is converted into an input torque U(t) by a control input production means 205 which comprises an actuator or a driving circuit therefor, and is applied to the physical plant 200. Thus, the output y(t) of the physical plant 200 which is produced by the applied input torque U(t) is controlled to confirm the desired trajectory.

According to the first embodiment, in order to make the output of the physical plant to follow the desired trajectory, the control input therefor is calculated by the input calculation means 204 on the basis of the control input coefficient "$b_{est}$" and the time length "L", and hence the physical plant having unknown input distribution coefficient is made to follow the predetermined desired trajectory.

FIG. 3 is a graph representing relation between the time length "L" and the ratio $$\frac{b_{est}}{b}$$

of the control input coefficient "$b_{est}$" to the input distribution coefficient "b". An unstable area and a bad following-property area are illustrated by shaded areas, and a stable and good following-property area is illustrated by nonshaded area.

Second Embodiment

A second embodiment of the adaptive control system in accordance with the present invention is to be applied to the physical plant of two-input-two-output having unknown input distribution matrix.

In the second embodiment, a heat pump system is taken as an example of the physical plant.

Figure 4:
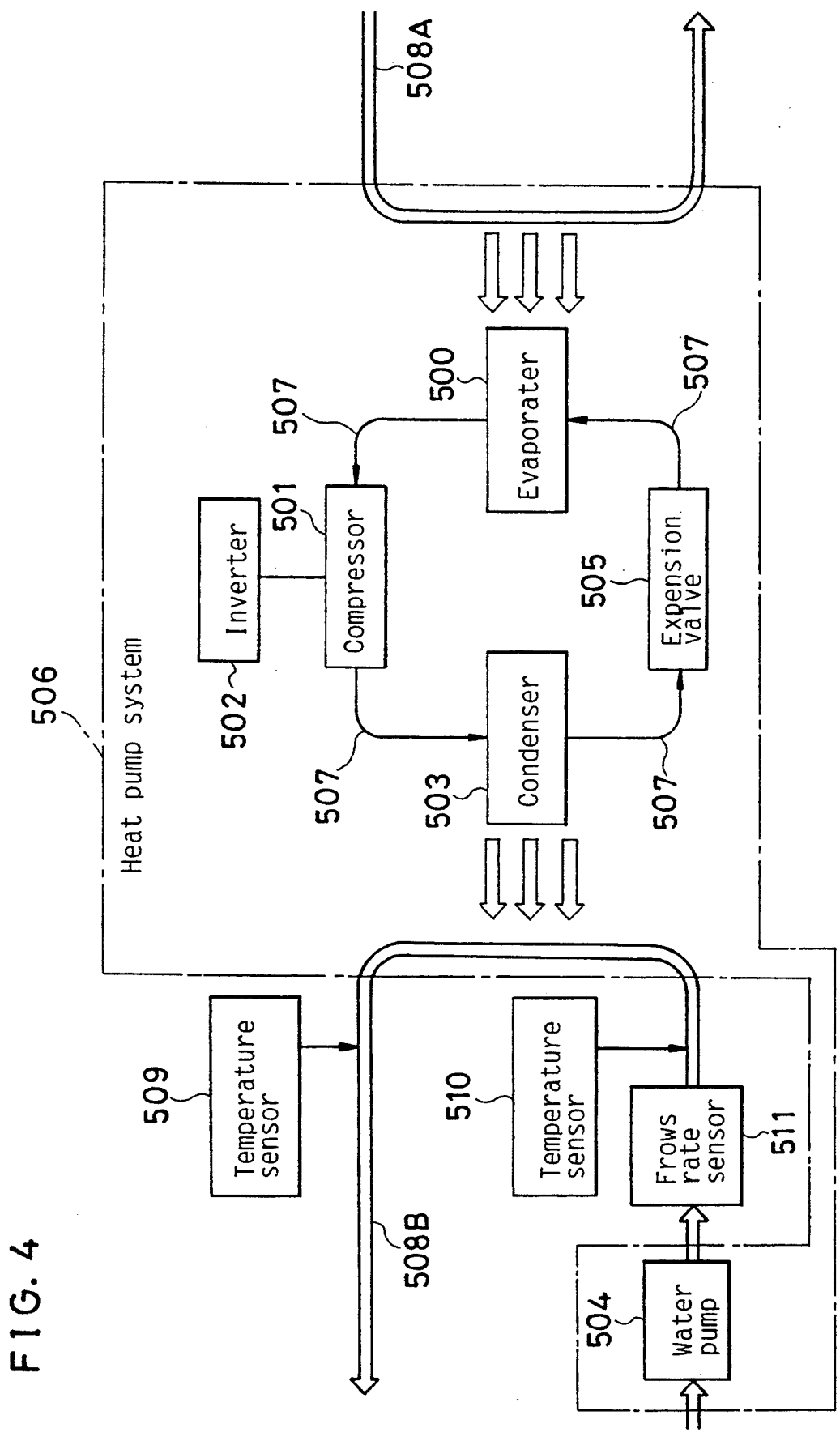
FIG. 4 is a block diagram of the heat pump system of an example of the physical plant to which a second embodiment of the adaptive control system of the present invention is applied.
Figure 5:
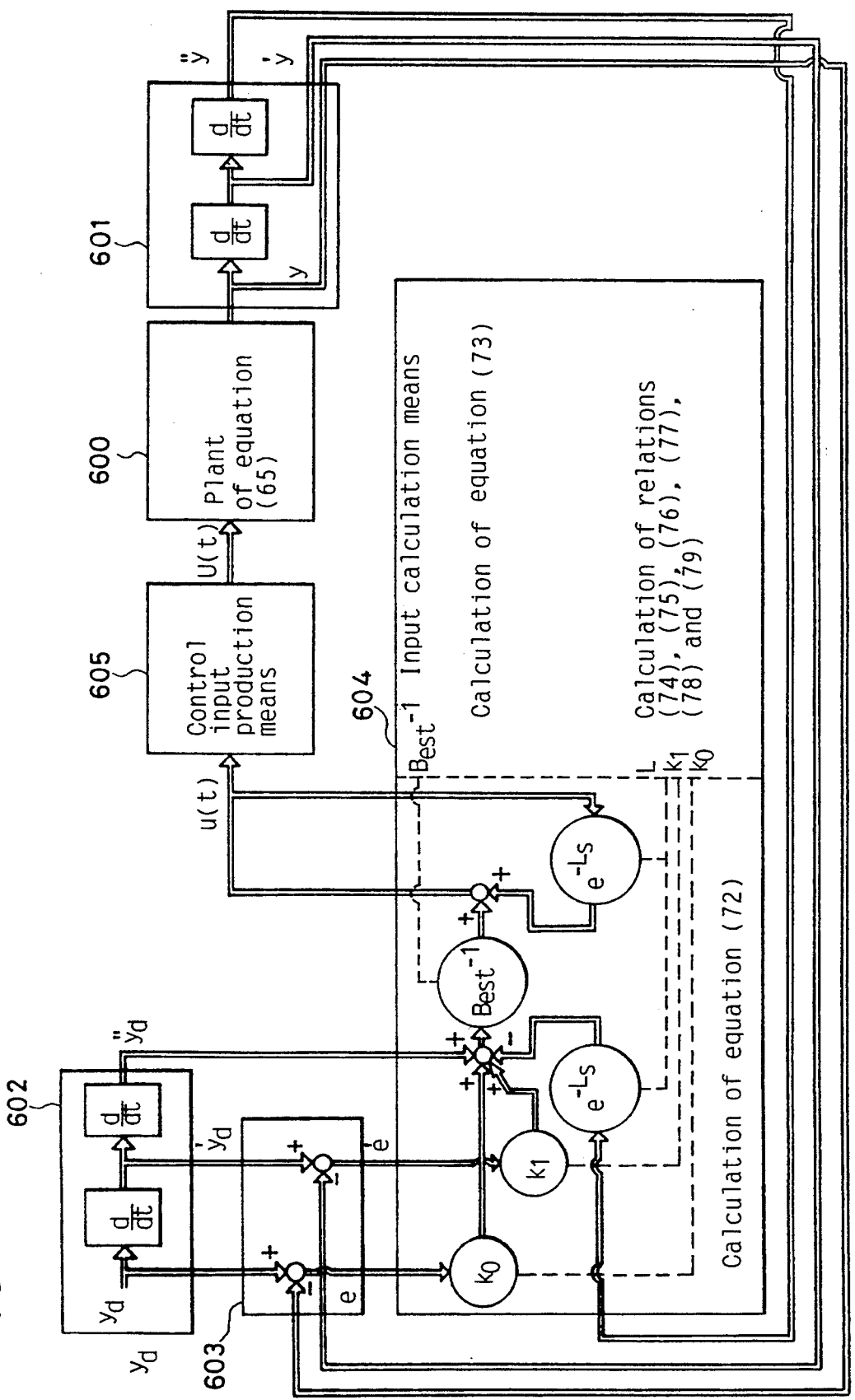
FIG. 5 is a block diagram of the second embodiment of the adaptive control system.

FIG. 4 is a block diagram of the heat pump system 506, and FIG. 5 is a block diagram of the adaptive control system for controlling the heat control system 506.

Referring to FIG. 4, a compressor 501, a condenser 503, an expansion valve 505 and an evaporator 500 are coupled in loop-shape by four pipe lines 507, and refrigerant is circulated through these pipe lines 507. A water line 508A is arranged adjacent to the evaporator 500, and the refrigerant is given heat from the water flowing the water line 508A. Then the refrigerant is compressed by the compressor 501 which is driven by an inverter 502. The compressed refrigerant is flowed in the condenser 503. Another water line 508B is arranged adjacent to the condenser 503, and the flow rate of the water is controlled by a water pump 504. In the condenser 503, heat of the refrigerant is given to the water flowing the water line 508B. Then the refrigerant is returned to the evaporator 500 through an expansion valve 505.

FIG. 5 is a block diagram of the adaptive control system of the second embodiment. A physical plant 600 in FIG. 5 corresponds to the heat pump system 506 of FIG. 4. A state output detection means 601 comprises a temperature sensor 509 for detecting temperature of the water at an outlet, a temperature sensor 510 for detecting temperature of water at an inlet thereof and a flow rate sensor 511.

First, a temperature $T_0$(°C.) which is a first output $y_1$ is detected by the temperature sensor 509. Second, a temperature $T_{in}$(°C.) is detected by the temperature sensor 510. Then, a temperature difference $T_{sub}$(°C.) is calculated by subtracting the temperature $T_{in}$ from the temperature $T_0$. Then, a second output $y_2$ of a calorie q(kcal/h) is calculated on the basis of the temperature difference $T_{sub}$(°C.) and a flow rate G (kg/h) which is detected by a flow rate sensor 511 as shown in equation (64).

$$y_2 = q = T_{sub} \cdot G \qquad (64).$$

Consequently, an output y(t) (=$[y_1, y_2]^T$) and the differential values of the output y(t) are output from the state output detection means 601. In the physical plant in which the input "u(t)=$[u_1, u_2]^T$" is a voltage which is applied to the water pump 504 and a voltage applied to the inverter 502, dynamic characteristic at various operational points of which the number of the operational point is "w" (w=1, 2,-p; "p" represents a predetermined number) is given by $$d^2y(t)/dt^2 + A_{w,1} \cdot dy(t)/dt + A_{w,0} \cdot y(t) = B_w u(t) \qquad (65),$$

where, $$B_w = \begin{vmatrix} b_{w,11}, & b_{w,12} \\ b_{w,21}, & b_{w,22} \end{vmatrix}, \qquad (66)$$

$$b_{w,11} < 0, \qquad (67)$$

$$b_{w,12}, b_{w,21}, b_{w,22} > 0,$$

$$A_{w,i} = \begin{vmatrix} a_{w,i,11}, & a_{w,i,12} \\ a_{w,i,21}, & a_{w,i,22} \end{vmatrix}, \qquad (69)$$

$$K_i = \begin{vmatrix} k_{i,11}, & 0 \\ 0, & k_{i,22} \end{vmatrix}. \qquad (70)$$

Subsequently, the desired trajectory vector "$y_d(t)$=$[y_{1d}(t), y_{2d}(t)]^T$" of temperature and calorie which are functions of time and a differential value of the desired trajectory vector are output from a trajectory production means 602.

Then, in an error value production means 603, calculation of equation (71) is performed, and an error vector e(t) and a differential value ê(t) of the error vector are output therefrom.

$$e(t) = y_d(t) - y(t) \qquad (71).$$

Moreover, in an output calculation means 604, calculation of equation (72) is performed, and a control input u(t) is output.

$$u(t) = u(t-L) + \{-\ddot{y}(t-L) + \dot{y}_d(t) + K_1 \dot{e}(t) + K_0 e(t)\}/b_{est}. \qquad (72)$$

In the equation (72), "L" represents a predetermined time length, "u(t−L)" represents the input vector which had applied to the physical plant the time length L ago, and "y(t−L)" represents the output vector which had detected by the state output detection means 601 the time length L ago, "$K_1$" and "$K_0$" are error dynamics adjustment matrixes and "$B_{est}$" represents a control input matrix which is used to calculate a control input vector u(t).

Where, the control input matrix "$B_{est}$" is the value given by $$B_{est} = \begin{vmatrix} -|b_{w,11}|_{max}, & b_{w,12 \cdot max}/2 \\ b_{w,21 \cdot max}/2, & b_{w,22 \cdot max} \end{vmatrix} \qquad (73)$$

Moreover, the time length L as the design parameter is determined so as to consistent with entire relations (74), (75), (76), (77), (78) and (79).

The relations (78) and (79) relate to the following-property to the desired trajectory.

$$L << \frac{2}{|2B_{est} \cdot B_w^{-1} \cdot A_{w,n-1} + K_1|_{max}}, \qquad (74)$$

$$L << \frac{2}{|(2B_{est} \cdot B_w^{-1} - I)K_1|_{max}}, \qquad (75)$$

$$L << \frac{|2K_1|_{min}}{|2B_{est} \cdot B_w^{-1} \cdot A_{w,0} + K_0|_{max}}, \qquad (76)$$

$$L << \frac{|2K_1|_{min}}{|(2B_{est} \cdot B_w^{-1} - I)K_0|_{max}}, \qquad (77)$$

-continued $$L \ll 2/\omega_0, \quad (78)$$

$$L \ll 2/|(B_{est}B_w^{-1} - I)|_{max}S\omega_0. \quad (79)$$

Then, the control input vector u(t) which is output from the input calculation means 604 is converted into an input vector "U(t)" by a control input production means 605 which comprises an actuator and a driving circuit therefor and is applied to the physical plant 600. Hence, the output "y(t)" of the physical plant 600 is controlled to follow the desired trajectory in compliance with the input vector "U(t)".

According to the second embodiment, the output of the physical plant of two-input-two-output is controlled to follow the desired trajectory by using the control input matrix "$B_{est}$" and the time length "L". Thus, the output of the physical plant having unknown input distribution matrix "B" is made to follow the desired trajectory.

Moreover, the physical plant having multi-input-multi-output can be controlled by using design parameters which satisfy the relations (28-1)–(28-q) with respect to the control input matrix "$B_{est}$", and by using the relations (22)–(25), (29) and (30) with respect to the time length L, and a similar effect is realizable. Referring to the relations (74)–(77), the time length "L" is selected in advance, and then the error dynamic adjustment matrix "$K_i$" can be determined so as to satisfy the time length "L" selected in advance. Hence a similar result is realizable.

Third Embodiment

In the third embodiment, a control input coefficient "$b_{est}$" is changed during operation of the adaptive control system so as to approach an actual input distribution coefficient "b". Consequently, the following-property of the output of a physical plant is further improved.

Figure 6:
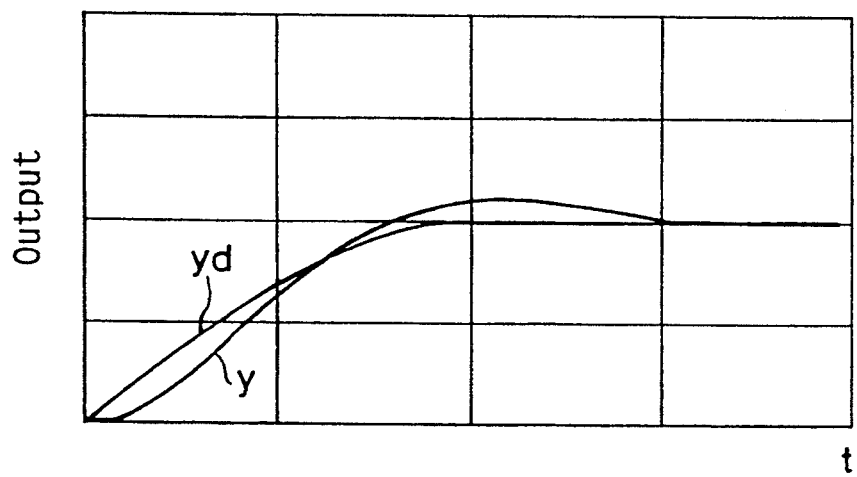
FIG. 6 is a diagram of relation between a desired trajectory and the output of the physical plant.

In the event that a control input coefficient "$b_{est}$" is significantly different from the input distribution coefficient "b" of the physical plant, and a time length "L" is relatively longer, the following-property with respect to a desired trajectory is deteriorated as shown in FIG. 6. Referring to FIG. 6, abscissa is graduated by the passage of time "t", and ordinate is graduated by the output of a physical plant and the desired trajectory thereof. The curve "y" representing the output of the physical plant is spaced from the curve "$y_d$" representing the desired trajectory.

In order to improve the following-property, the time length "L" is set to the value as mentioned in the second embodiment (relations (74)–(79)). Then, the initial value of a control input coefficient "$b_{est}$" is set to the control input coefficient "$b_{max}$" so as to maintain stability with respect to variation of an input distribution coefficient "b". In the event that the following-property is not satisfied by the above-mentioned operation, the control input coefficient "$b_{est}$" is varied in a manner that the following-property is improved. The above-mentioned operation is described in detail below.

Figure 8:
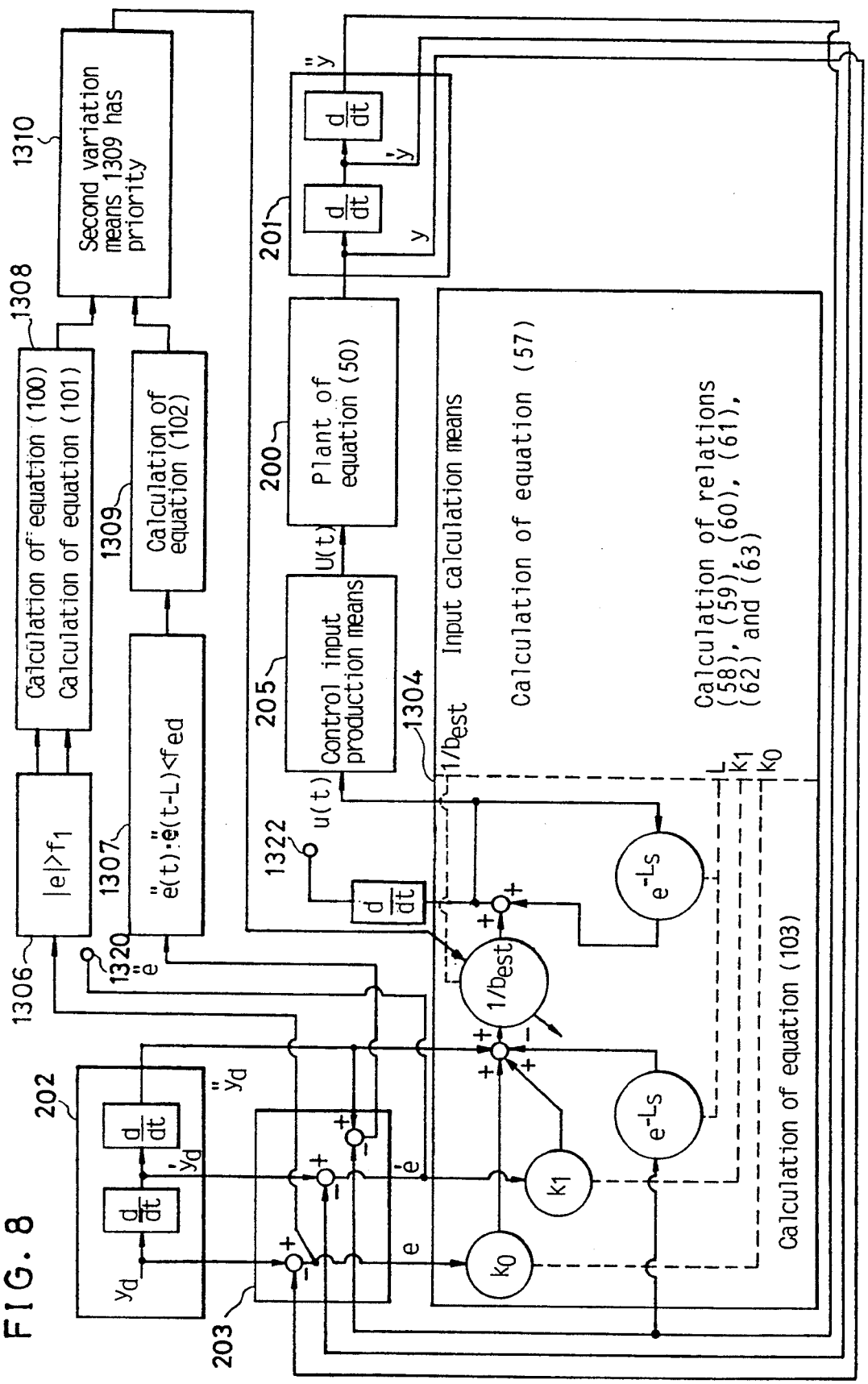
FIG. 8 is a block diagram of a third embodiment of the adaptive control system of the present invention.

(I) The error "e" and a differential value ė of the error output from the error value production means 1303 in FIG. 8 are compared with a predetermined value of an error "$f_i$". Consequently, in the event that at least one of the conditions shown by relations (80), (81) and (82) are satisfied, it is determined that the following-property is bad. The comparison is performed during a predetermined set-time length $t_{lim}$ or more.

$$\text{IF } |e| > f_1 \quad (80),$$

$$\text{IF } |e| > f_2 \text{ and } |\dot{e}| > f_3 \text{ and } e \cdot \dot{e} > 0 \quad (81),$$

IF $|e| > f_4$ and $|\dot{e}| < f_5$ and $e \cdot \dot{e} < 0$, and reduction rate of the error is larger than the reduction rate of the desired error (82).

In first order lag system, determination is performed by relation (85) as replacement for the relation (82).

$$|(1-\exp(-k \cdot L)) \cdot e(t-L)| < |e(t-L) - e(t)| \quad (85).$$

When a periodic time of control is equal to the time length $T_{lim}$, the following-property is determined every periodic times.

The error is a time-variant value. Therefore, in the event that the conditions shown by the relations (80), (81) and (82) are not satisfied owing to the variation of the error, a time length $T_{lim}$ for satisfying the condition of the relation (80), for example, is detected during the set-time length $t_{lim}$. Then, the ratio ($r_{lim}$) of the time length $T_{lim}$ to the set-time length $t_{lim}$ is calculated as shown by relation (83), and the ratio ($r_{lim}$) can be used to determine the following-property.

$$\frac{T_{lim}}{t_{lim}} \geq r_{lim}. \quad (83)$$

An average values of the error and the differential value of the error are usable as replacements for the error and the differential value of the error, and an example thereof is given by $$|e|ave = \sum_{i=1}^{n} |e|/n. \quad (84)$$

(II) In the event that relation (86) or (87) is satisfied, a stability is determined to be bad. The product value of n-order differential value at a time (t) and at a time (t−L) is compared with a predetermined value ($f_{ed}$) of error as shown by relation (86).

$$\overset{(n)}{e}(t) \cdot \overset{(n)}{e}(t-L) < f_{ed} \, (f_{ed} < 0). \quad (86)$$

Then a product of differential values of inputs at the time (t) and at the (t−L) is compared with a predetermined value $f_{ud}$ of error as shown by relation (87).

$$\dot{u}(t) \cdot \dot{u}(t-L) < f_{ud} \, (f_{ud} < 0) \quad (87).$$

Referring to the relation (86) or (87), comparison is performed during the time length $t_{lim}$ or more.

In a similar manner, as described with respect to the relations (80), (81) and (82), when the periodic time of control is equal to the set-time length $t_{lim}$, stability is determined every the periodic time. When the set-time length $t_{lim}$ is relatively longer, determination of the stability is performed by continuous several times of satisfaction of the conditions given by the relation (86) or (87).

Design parameters can be changed in order to improve the following-property and stability as described below.

(I) In the event that the following-property is bad.

A control input coefficient "$b_{est}$" is reduced at a predetermined rate by multiplying a control input coefficient "$b_{est}$" by a predetermined constant $c_d$ which is smaller than "1.0" as shown by equation (88).

$$b_{est} \leftarrow b_{est} \cdot C_d \ (C_d < 1.0) \tag{88}$$

Then, the control input coefficient "$b_{est}$" is calculated in accordance with an error as shown by non-linear relation (89) or (90). In this case, the control input coefficient "$b_{est}$" is reduced.

$$b_{est} \leftarrow b_{est}/(1+|e|^{f_b} \cdot f_a) \tag{89}$$

$$b_{est} = b_{max}/(1+|e|^{f_b} \cdot f_a) \tag{90}$$

"$f_a$" and "$f_b$" are constants which are given by the grade of error variation. When the constant "$f_b$" is equal to "1.0", the relations (89) and (90) become linear relations.

Moreover, an average absolute value of an error ($|e|_{ave}$) during the setting time $t_{lim}$ is usable as replacement for the absolute value of an error ($|e|$).

(II) In the event that following-property is good.

The control input coefficient "$b_{est}$" is maintained as shown by equation (91).

$$b_{est} \leftarrow b_{est} \tag{91}$$

Moreover, the control input coefficient "$b_{est}$" in the equation (90) is made to the control input coefficient "$b_{max}$" as shown by equation (92).

$$b_{est} = b_{max} \tag{92}$$

Referring to these relations (88) and (89), the control input coefficient "$b_{est}$" of the left sides is a new control input coefficient "$b_{est}$" which is calculated on the basis of an old control input coefficient "$b_{est}$" of the right sides.

Referring to the relations (88) and (89), the control input coefficient "$b_{est}$" is progressively reduced apart from an initial value of the control input coefficient ("$b_{max}$", for example) by the calculation of the relations (88) and (89). Consequently, the control input coefficient "$b_{est}$" approaches an optimum control input coefficient "$b_1$". Consequently, the error decreases, and thus the following-property is improved.

The above-mentioned method is applicable to a physical plant of which the control input coefficient "b" is temporarily varied. Such case is shown, in FIG. 1, in the example that the load 105 is moved along the rod 102 to a predetermined position, and after then the load 105 is held at the position.

In the event that the control input coefficient "b" is quickly varied, the variation method shown by equations (90) and (92) are preferable. Referring to the equations (90) and (92), the control input coefficient "$b_{est}$" is varied when the error is large, and in this case, the control input coefficient "$b_{est}$" is made to the control input coefficient "$b_{max}$".

(III) In the event that the stability is bad.

The control input coefficient "$b_{est}$" is made to increase at a constant rate by multiplying the input coefficient "$b_{est}$" by a predetermined constant $C_u$ which is larger than 1.0 as shown by the relation (93).

$$b_{est} \leftarrow b_{est} C_u \ (C_u > 1.0) \tag{93}$$

Alternatively, the control input coefficient "$b_{est}$" can be made to the control input coefficient "$b_{max}$" as shown by relation (94).

$$b_{est} = b_{max} \tag{94}$$

In the event that both the following-property and stability are bad, the stability is improved with priority.

Calculations by the relations (80)–(87) can be performed by fuzzy inference calculation. In the Fuzzy inference calculation, the situation part comprise variables for determining following-property, and the action part comprises variables for varying design parameters.

An example of the fuzzy inference representation is given by $$\text{If } e \text{ is PB and } \dot{e} \text{ is NS, then } b_{est} \text{ is } q_i \tag{95}$$

where, PB: positive big, NS: negative small, $q_i$: a real number.

When an error "e" and the differential value "ė" of the error "e" are inputted, the following result is obtained by the fuzzy inference representation (95):

$$\mu_i(q_i) = \mu_{PB}(e) \wedge \mu_{NS}(\dot{e}) \wedge l \tag{96}$$

Where, "$\wedge$" represents MIN-calculation in the fuzzy reference calculation.

The Fuzzy inference calculation comprises a plurality of the fuzzy inference representations. Consequently, the final result of the fuzzy inference calculation is given by $$b_{est} = \frac{\Sigma \mu_i(q_i) \cdot q_i}{\Sigma \mu_i(q_i)} \tag{97}$$

An example of the adaptive control system using the fuzzy inference calculation will be described hereafter in reference with FIG. 9(d).

In a physical plant which is influenced by a dead-time, low-order-approximation, time optimum design parameter can be obtained by an experimental method. According to the experimental method, the control input coefficient "$b_{est}$" of time TDC as shown by the equation (3), error dynamics adjustment matrix "$k_i$" and time length "L" are automatically varied.

Figure 7:
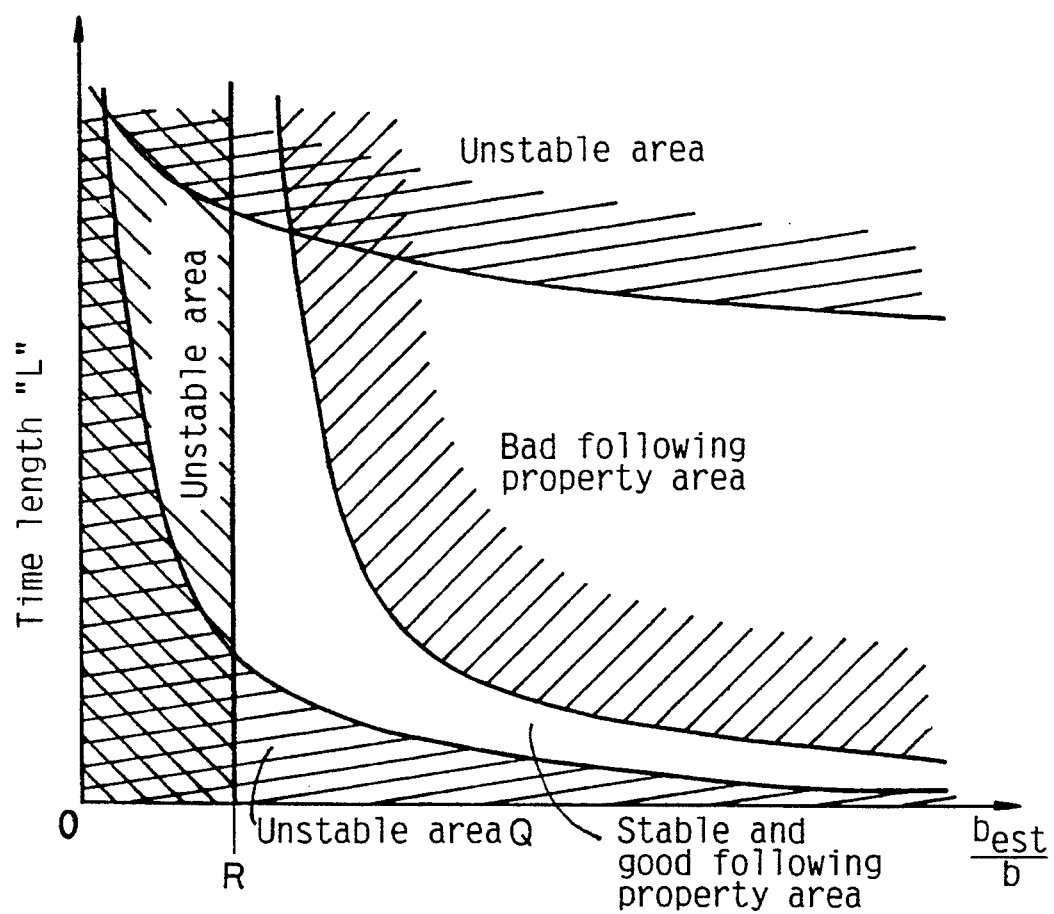
FIG. 7 is a diagram of the relation between the time length "L" and the control input coefficient "$b_{est}$"

FIG. 7 is a graph of the relation between the time length "L" and the ratio of time control input coefficient "$b_{est}$" to the input distribution coefficient "b" for illustrating the areas of stability and following-property of an actual physical plant of single-input-single-output. Referring to FIG. 7, ordinate is graduated by the time length "L", and abscissa is graduated by time ratio of the control input coefficient "$b_{est}$" to time control input distribution coefficient "b". An unstable area Q is produced by a parasitic mode such as the dead-time or the higher order dynamic characteristic.

On the other hand, in order to improve the following-property, the stable-and-good-following-property area is liable to be narrowed. Furthermore, there is occasion where the design parameters lack the proper stable-and-good-following-property area.

In the event that the adjustment of the design parameters is impossible, a response speed which gives influence to the following-property must be reduced by decreasing the error dynamics adjustment matrix "$K_i$". Consequently, the control input coefficient "$b_{est}$" is increased. In the above-mentioned case, since the following-property is deteriorated by increase of the control input coefficient "$b_{est}$", a slight reduction of the control input coefficient "$b_{est}$" is recommendable to improve the following-property. However, in the event that the ratio of the control input coefficient "$b_{est}$" to the control input distribution coefficient "b" is lesser than 0.5 ($b_{est}/b<0.5$), the adaptive control system is oscillated.

If the time length "L" is reduced, the following-property is improved. However, excessive reduction of the time length "L" results in oscillation of the adaptive control system in the event that the influence of the higher order dynamic characteristic or the dead-time can not be disregarded.

Moreover, excessive increase of the error dynamics adjustment coefficient $k_i$ results in oscillation of the adaptive control system. Therefore, there is no compatibility in change of the design parameters. Then, the initial value of the control input coefficient "$b_{est}$" is set to the control input coefficient "$b_{max}$". In the event that the parasitic mode influences to the following-property in such initial value, one of the following changes is performed:

The control input coefficient "$b_{est}$" is increased.

The dynamics adjustment coefficient "$k_i$" is decreased.

The time length "L" is increased. Consequently, the stability is improved by the above-mentioned change of the design parameters.

According to the third embodiment, the error or the differential value of the error of the actual input distribution coefficient "b" are determined with respect to the physical plant of single-input-single-output by change of the control input coefficient "$b_{est}$" on the basis of the error, the differential value of the error or the differential value of the input. Then, the control input coefficient "$b_{est}$" is changed in real time, and thereby the output of the physical plant is made to follow the desired trajectory.

FIG. 8 is a block diagram of the third embodiment of the adaptive control system. Referring to FIG. 8, the physical plant 200, the state output detection means 201, the trajectory production means 202, the error value production means 203 and the control production means 205 are identical with those of the first embodiment.

In a first output judgment means 1306, following-property is determined by using the error e(t), in the event that the absolute value of the error is larger than a predetermined value $f_1$ as shown by relation (98).

$$\text{IF } |e|>f_1 \tag{98}$$

Moreover, in a second output judgment means 1307, stability is determined by using the second order differential value of the error as shown by relation (99).

$$\ddot{e}(t)\cdot\dot{e}(t-L)<f_{ed} \tag{99}$$

When bad following-property is determined by satisfying the relation (98), calculation given by equation (100) is performed by using the absolute value of the error within the time $t_{lim}$ in the first parameter change means 1308.

$$b_{est}=b_{est}/(1+f_{a}\cdot|e|^{fb}) \tag{100}$$

When the relation (98) is not satisfied, good following-property is determined by the first output judgment means 1306. Consequently, as shown by equation (101), the control input coefficient "$b_{est}$" is not changed and is held to the value at the last time.

$$b_{est}=b_{est} \tag{101}$$

When the relation (99) is satisfied and bad stability is determined, in a second parameter change means 1309, the control input coefficient "$b_{est}$" is increased as given by relation (102).

$$b_{est}=b_{est}\cdot C_u \ (C_u>1.0) \tag{102}$$

When the relation (99) is not satisfied, good stability is determined by the second output judgment means 1307, the control input coefficient "$b_{est}$" is not output by the second parameter change means 1309. Then the control input coefficient "$b_{est}$" which is output from the second parameter change means 1309 has priority to the control input coefficient "$b_{est}$" output from the first parameter change means 1308. The priority is determined by the parameter determination means 1310. Then, in the event that the control input coefficient "$b_{est}$" is output from the second parameter change means 1309, the control input coefficient "$b_{est}$" is employed by the parameter determination means 1310. On the other hand, in the event that the control input coefficient "$b_{est}$" is not output from the second parameter change means 1309, the control input coefficient "$b_{est}$" output from the first parameter change means 1308 is employed by the parameter determination means 1310.

Subsequently, a control input u(t) is calculated by equation (103) in an input calculation means 1304 by using the control input coefficient "$b_{est}$" output from the parameter determination means 1310.

$$u(t)=u(t-L)+\{-\ddot{y}(t-L)+\ddot{y}_d(t)+k_1\cdot\dot{e}(t)+k_0\cdot l9 \ e(t)\}/b_{est} \tag{103}$$

The time length "L" is set to a value which satisfies the relations (58)–(63) in a similar manner of the first embodiment. Moreover, the initial value of the control input coefficient "$b_{est}$" is set to the control input coefficient "$b_{max}$" as given by the equation (57). The control input u(t) is applied to the physical plant 200 through the control input production means 205.

FIGS. 9(a), 9(b), 9(c), 9(d) and 9(e) are block diagrams of relevant parts of the third embodiment for partially changing the configuration in FIG. 8.

Figure 9A:
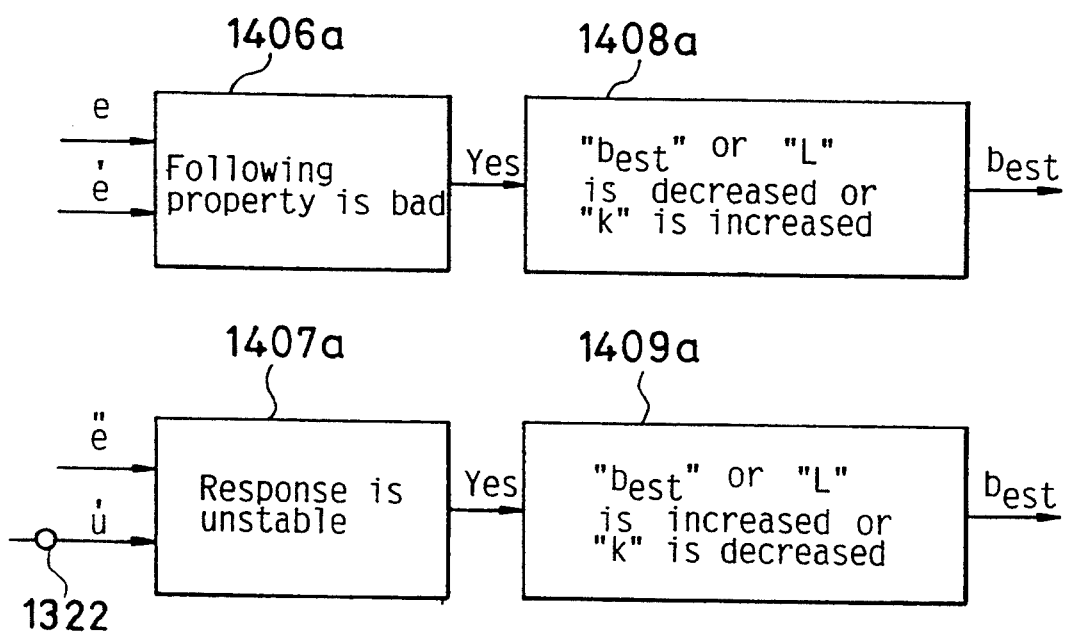
FIGS. 9(a), 9(b), 9(c), 9(d) and 9(e) are block diagrams of relevant parts in FIG. 8.

Referring to FIG. 9(a), a first and a second output judgment means 1406(a) and 1407(a) correspond to the first and second output judgment means 1306 and 1307 in FIG. 8, respectively. Moreover, a first and a second parameter change means 1408(a) and 1409(a) correspond to the first and second parameter change means 1308 and 1309 in FIG. 8, respectively. In the configuration, in the event that bad following-property is determined, the control input coefficient "$b_{est}$" or the time length "L" is decreased, or the error dynamics adjustment coefficient "k" is increased. On the other hand, in the event that bad stability is determined, the control input coefficient "$b_{est}$" or the time length "L" is increased, or the error dynamics adjustment coefficient "k" is decreased.

Figure 9B:
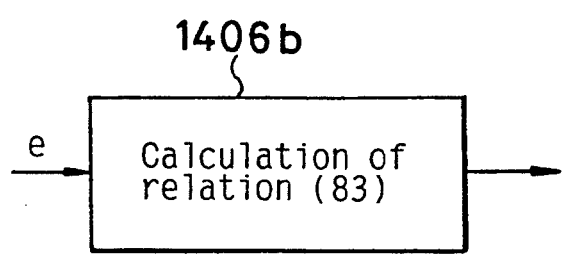

In the example shown by FIG. 9(b), the first output judgment means 1406(b) is comprised as replacement for the first output judgment means 1306, thereby calculation based on the relation (83) is performed. By the calculation, the ratio of a predetermined setting time $t_{lim}$ to a time length $T_{lim}$ in which the error value "e" exceeds a predetermined error value "$f_i$" during the setting time $t_{lim}$ is obtained. When the ratio is larger than a predetermined value $r_{lim}$, bad following-property is determined. Then, stable control is realizable by increasing the setting-time $t_{lim}$, and hence stable control is realizable.

Figure 9C:
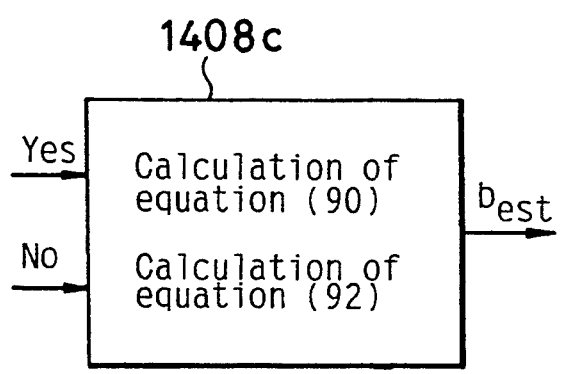

In a physical plant in which an input distribution coefficient is quickly varied, a first parameter change means 1408(c) shown in FIG. 9(c) is used as replacement for the first parameter change means 1308 in FIG. 8. In the first parameter change means 1408(c), calculation based on the equation (90) or equation (92) is performed in accordance with the output of the first output judgment means 1306 which is inputted to the first parameter change means 1408(c). Namely, in the event that the output of the first judgment means 1306 is "Yes" (the error value is larger than a predetermined value), the calculation of the equation (90) is performed, and the control input coefficient "$b_{est}$" is varied in accordance with the error value. On the other hand, in the event that the output of the first output judgment means 1306 is "No" (the error value is smaller than the predetermined value), the control input coefficient "$b_{max}$" which is a maximum control input coefficient is employed.

Figure 9D:
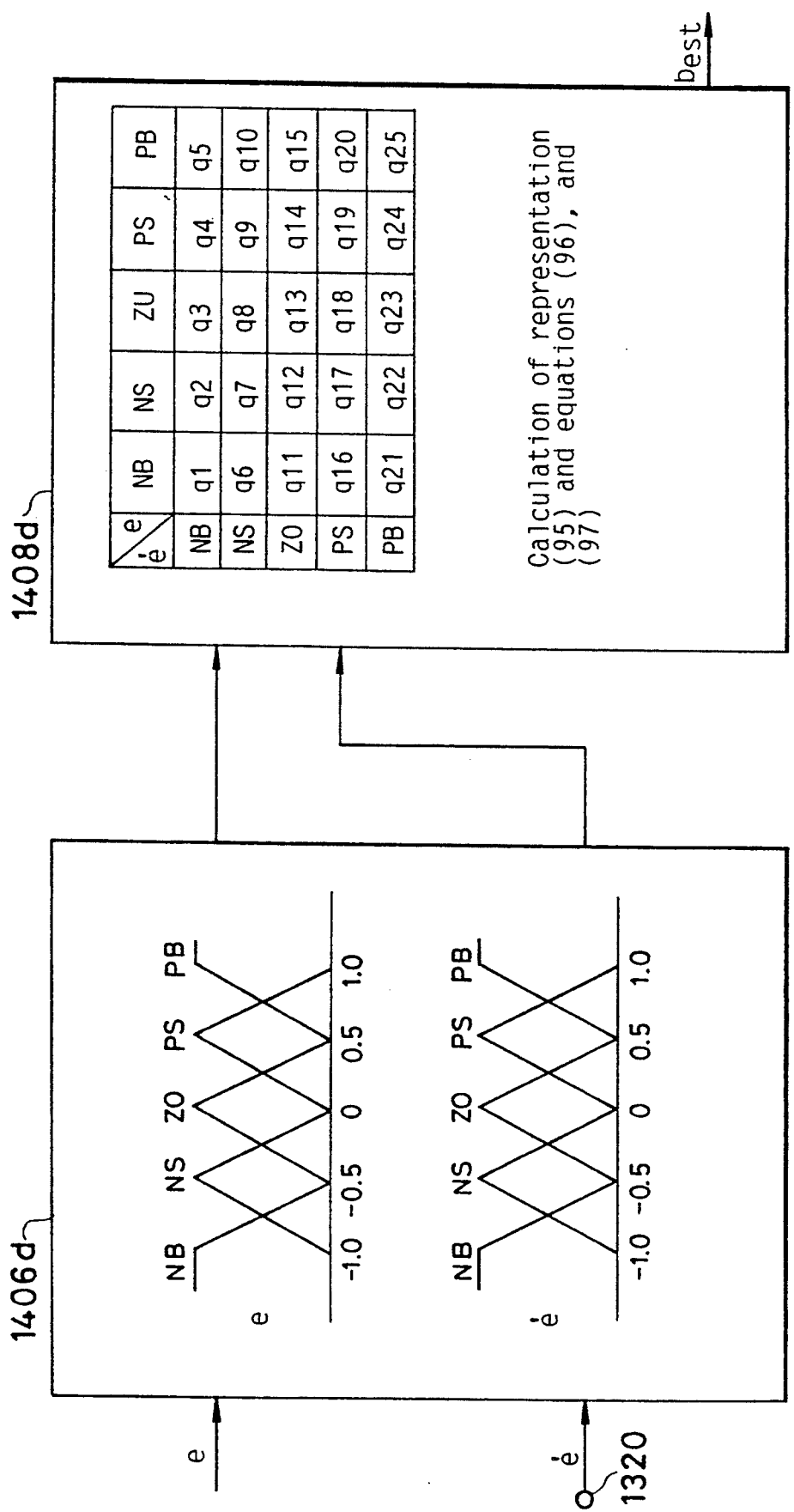

FIG. 9(d) is a block diagram of an example using fuzzy inference calculation in a first output judgment means 1406(d) and a second parameter change means 1408(d). In the fuzzy inference calculation, five fuzzy variables of NB (negative big), NS (negative small), ZO (zero), PS (positive small), and PB (positive big) are set in the first output judgment means 1406(d). Data of an error "e" and the differential value "ė" of the error "e" are memorized with a predetermined normalizing coefficient. The real values "$q_i$" are selected in accordance with the fuzzy variables of the error "e" and the differential value "ė" of the error "e" as shown in a table of the second parameter change means 1408(d). The normalizing coefficient and the real value "$q_i$" are selected in a manner that the following property is improved.

Figure 9E:
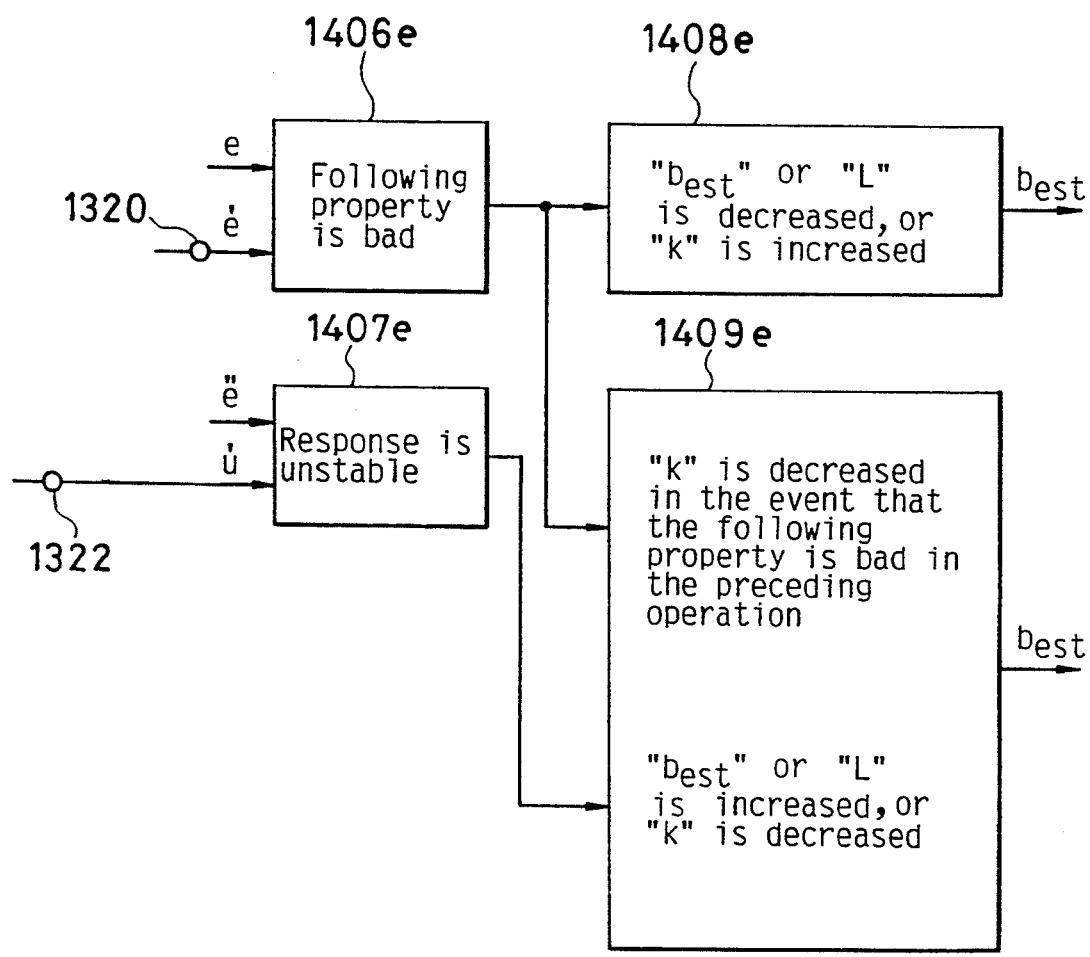

Moreover, every design parameters are experimentally changed to obtain optimum values for the physical plant having inaccurate transfer function or a parasitic mode. In the above-mentioned case, as shown in FIG. 9(e), a first and second output judgment means 1406(e) and 1407(e) are used as replacements for the first and second output judgment means 1306 and 1307, respectively. Moreover, a first and a second parameter change means 1408(e) and 1409(c) are used as replacements for the first and second parameter change means 1308 and 1309, respectively. In operation, the design parameters of the control input coefficient "$b_{est}$", time length "L" and the error dynamics adjustment matrix "k" are changed on the basis of the result of judgment by the first and second output judgment means 1406(e) and 1407(e) in order to determine optimum design parameters. In the above-mentioned case, the initial values of the control input coefficient "$b_{est}$" and the time length "L" can be selected from arbitrary values.

Fourth Embodiment

In the first, second and third embodiments mentioned above, the description is related to the adaptive control system for controlling a physical plant to a predetermined desired trajectory. In the fourth embodiment, the physical plant is controlled to the output which is instructed by a reference model.

Figure 10:
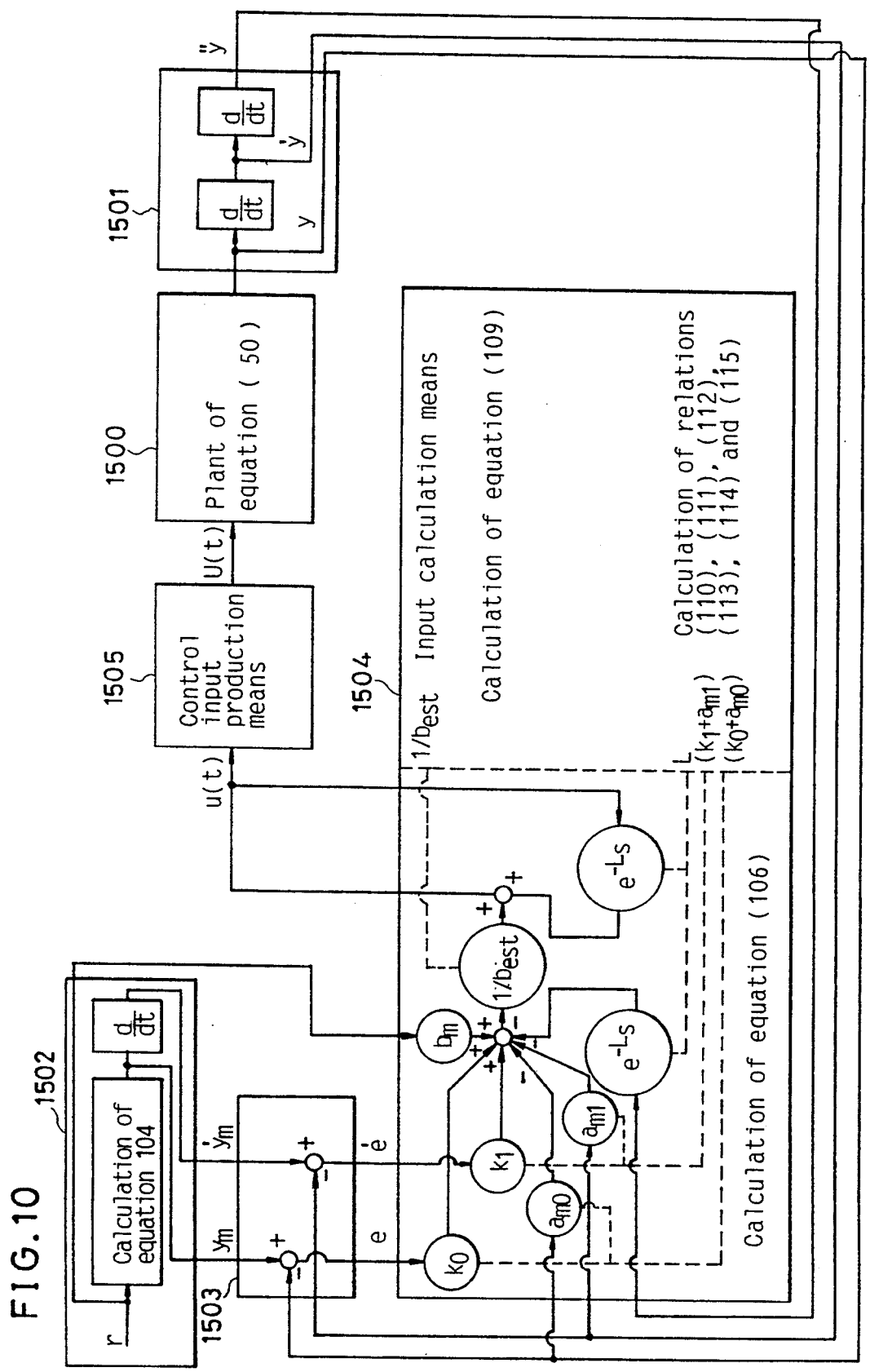
FIG. 10 is a block diagram of a fourth embodiment of the adaptive control system of the present invention.

FIG. 10 is a block diagram of the fourth embodiment of the adaptive control system. Referring to FIG. 10, in a reference state output production means 1502, calculation is performed on the basis of equation (104) comprising predetermined reference model coefficients $a_{m1}$, $a_{m0}$ and $b_m$ with respect to the input of a reference model r(s). Consequently, the reference model output $y_m(t)$ of single-input-single-output: and the differential value $y_m(t)$ thereof are output.

$$\frac{y_m(s)}{r(s)} = \frac{b_m}{s^2 + a_{m1} \cdot s + a_{m0}}. \tag{104}$$

In the error value production means 203, an error e(t) is calculated from the output $y_m(t)$ and the output y(t) detected by the state output detection means 201, and the differential value ė(t) of the error is calculated from the differential value ẏ(t) of output $y_m(t)$ and the differential value ẏ(t) of the output y(t) on the basis of equation (105).

$$e(t) = y_m(t) - y(t) \tag{105}$$

The error e(t) and the differential value ė(t) of the error are applied to an input calculation means 1504.

In the input calculation means 1504, an input u(t) is calculated by equation (106).

$$u(t) = u(t - L) + \{-y(t - L) - a_{m1} \cdot y(t) - \tag{106}$$
$$a_{m0} \cdot y(t) + b_m \cdot r(t) +$$
$$k_1 \cdot e(t) + k_o \cdot \dot{e}(t)\}/b_{est}.$$

Consequently, a desired error dynamics is calculated on the basis of equations (104), (105) and (106), and is represented by equation (107).

$$\ddot{e}(t) + (a_{m1} + k_1) \cdot \dot{e}(t) + (a_{m0} + k_0) \cdot e(t) = 0 \tag{107}$$

In the fourth embodiment, the equation (107) is corresponds to the equation (56) in the first embodiment. In the equation (56), "$K_i$" is replaced with "$(A_{m,i} + K_i)$" as given by $$K_i \rightarrow (A_{m,i} K_i) \tag{108}$$

Therefore, the equations introduced in the first embodiment is applicable to the fourth embodiment.

In a similar manner mentioned above, the control input coefficient "$b_{est}$" shown by the equation (106) is selected as given by $$b_{est} = b_{max} \tag{109}$$

The equation (109) is identical with the equation (57).

Moreover, in determination of the time length "L," "$k_i$" in the equations (58), (59), (60) and (61) is replaced with "$(a_{m,i} + k_i)$", and consequently, equations (110), (111), (112), (113), (114) and (115) are obtained.

$$L << 2/\{(2b_{est}/b_{min})-1)\cdot(k_1+a_{m1})\} \quad (110),$$

$$L << 2/\{(2a_{1\cdot max}\cdot(b_{est}/b_{min})+(k_1+a_{m1})\} \quad (111),$$

$$L << 2\cdot(k_1+a_{m1})/[\{2(b_{est}/b_{min})-1\}\cdot(k_0+a_{m0})] \quad (112),$$

$$L << 2\cdot(k_1+a_{m1})/(2a_{0\cdot max}\cdot(b_{est}/b_{min})+(k_0+a_{m0})) \quad (113),$$

$$L << 2/\omega_0 \quad (114),$$

$$L << 2/\{(2(b_{est}/b_{min})-1)\cdot\omega_0\} \quad (115).$$

Then, the time length "L" is determined which satisfies entire conditions given by these relations (110-115).

In the input calculation means 1504, a control input u(t) is calculated on the basis of the equation (106) by using the control input coefficient "$b_{est}$", the time length "L" and the sum of the reference model coefficient and the error dynamics adjustment matrix "$a_{mi}+k_i$" which satisfy the above-mentioned relations. The control input u(t) is applied to a physical plant 200 through a control input production means 205. Consequently, the output of the physical plant having unknown input distribution coefficient meets the output of the reference model.

Moreover, in the second embodiment and the third embodiment, the same conversion mentioned above is applicable by applying conversion based on the representation (108). Consequently, the output of the physical plant meets the output of the reference model in the second and third embodiments.

The adaptive control system also may be constructed by a digital circuit, for example. In such case, the time length of the product of a sampling periodic time and an integer is selected for the time length "L".

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A control system for a physical plant wherein the physical plant has a number of inputs, q, equal to a number of outputs, modeled by the relationship $$y(s) = (s^n I - A_{w,n-1}\cdot s^{n-1} - \ldots - A_{w,0})^{-1} B_w u(s),$$

wherein s is a Laplace variable, y(s) is a q-dimensional output vector, u(s) is a q-dimensional input vector, $A_{w,i}$ (w=1—p, i=n−1—0) is an unknown plant matrix having dimensions q×q, $B_w$ is an unknown input distribution matrix having dimensions q×q, "I" is a q×q-dimensional unit matrix, and "w" represents a number of operational points where (w=1, 2—p, p being a predetermined number) and "n" is an integer;

the control system comprising:
state output detecting means, including means for detecting a state output vector y(t) and differentials $dy(t)/dt$—$d^n y(t)/dt^n$ of said state output vector which represent said operating conditions of said physical plant,
trajectory production means, including means for producing a desired trajectory vector $y_d(t)$ and differentials $dy_d(t)/dt$—$d^n y_d(t)/dt^n$ of said desired trajectory vector which represent said desired operating conditions,
error value production means, including means for producing error signals $e(t)=y_d(t)-y(t)$ and differentials $de(t)/dt$—$d^{n-1}e(t)/dt^{n-1}$ of said error signals e(t) using said state output vector y(t), said differentials $dy(t)/dt$—$d^n y(t)/dt^n$ of said state output vector, said desired trajectory vector $y_d(t)$ and the differentials $dy_d(t)/dt$—$d^n y_d(t)/dt^n$ of said desired trajectory vector,
control signal generating means for generating a control signal, u(t), from a relationship $$u(t)=u(t-L)+B_{est}^{-1}\cdot\{-d^n y(t-L)/dt^n + d^n y_d(t)/dt^n + K_{n-1}\cdot d^{n-1}e(t)/dt^{n-1}+\ldots+K_0\cdot e(t)\}$$

where L represents the predetermined time period, $B_{est}$ represents the control input signal, and $K_{n-1}$—$K_0$ represent error dynamics adjustment signals, said control signal generating means including:
control input signal generating means for generating said control input signal based on a predetermined relationship generating said control input signal, $B_{est}$, such that entire coefficients with respect to "s" are positive in a characteristic relationship determined from a relationship $$\det\{(2B_{est}B_w^{-1}-I)Ls+2I\},$$

predetermined time period generating means for generating said error dynamics adjustment signals $K_{n-1}$—$K_0$ and said predetermined time period L so that the predetermined relationships $$L << 2/|2B_{esr}B_w^{-1}\cdot A_{w,n-1}+K_{n-1}|_{max},$$

$$L << 2/|(2B_{esr}B_w^{-1}-I)K_{n-1}|_{max},$$

$$L << |2K_i|_{min}/|2B_{esr}B_w^{-1}\cdot A_{w,i-1}+K_{i-1}|_{max},$$

$$L << |2K_i|_{min}/|(2B_{esr}B_w^{-1}-I)K_{i-1}|_{max},$$

$$L << 2/\omega_0,$$

$$L << 2/\{|(B_{esr}B_w^{-1}-I)|_{max}\cdot\omega_0\}$$

are satisfied for i=(n−1) to 1
where $|2K_i|_{min}$ is a minimum absolute value of a component of an error dynamics signal "$k_i$" with the exception of a zero component of said error dynamics signal $2K_i$, and $\omega_0$ is a frequency range which is required for tracking of said desired trajectory, and
control signal application means for controlling said physical plant in accordance with said generated control signal.

2. The control system as in claim 1, wherein
said physical plant has a single-input and a single-output modelled by the relationship $$y(s)/u(s) = b_w/(s^n + a_{w,n-1}s^{n-1}+\ldots+a_{w,0}),$$

where s is a Laplace variable, y(s) is an output vector and u(s) is an input vector, $a_{w,n-1}\ldots a_{w,0}$ is the unknown plant matrix, $b_w$ is the unknown input distribution matrix hereinafter called "the unknown input distribution coefficient", the unknown plant matrix is further defined as $a_{w,1}$-($0<a_{w,1\cdot min}\leq a_{w,1}\leq a_{w,1}\cdot max$ (w=1—p, i=n-

$-1-0$) and the unknown input distribution coefficient is defined as $b_w(0 < b_{min} \leq b_w \leq b_{max})$;

said control signal generating means for generating said control signal, u(t), from the relationship $$u(t) = U(t-L) + [-d^n y(t-L)/dt^n + d^n y_d(t)/dt^n + k_{n-1} \cdot d^{n-1} e(t)/dt^{n-1} + \ldots + k_0 \cdot e(t)]/b_{est}$$

where L represents the predetermined time period, $B_{est}$ represents the control input signal, $k_{n-1}$—$k_0$ represents the error dynamics adjustment signal, said control input signal generating means including control input coefficient generating means for generating a control input coefficient generating means for generating a control input coefficient $b_{est}$ which satisfies the relationship "$b_{est} > b_{max}/2$"

and said error dynamics signal generating means includes predetermined time period generating means for generating said error dynamics signal, defined by $$d^n e(t)/dt^n = -k_{n-1} \cdot d^{n-1} e(t)/dt^{n-1} - \ldots - k_0 \cdot e(t),$$

and said predetermined time period L so that the relationships $$L << 2/\{2a_{w,n-1 \cdot max} \cdot (b_{est}/b_{max}) + k_{n-1}\},$$

$$L << 2/\{(2b_{est}/b_{min}) - 1) \cdot k_{n-1}\},$$

$$L << 2 \cdot k_i/(2a_{w,i-1 \cdot max} \cdot (b_{est}/b_{min}) + k_{i-1}),$$

$$L << 2 \cdot k_i/[(2(b_{est}/b_{min}) - 1) \cdot k_{i-1}],$$

$$L << 2/\omega_0,$$

$$L << 2/\{(2b_{est}/b_{min}) - 1) \cdot \omega_0\}$$

are also satisfied for, $i = (n-1)$ to 1, and said control signal application means for controlling said physical plant in accordance with said generated control signal.

3. The control system as in claim 1, wherein said physical plant has two inputs and two ouputs modelled by the relationship $$y(s) = (s^n I - A_{w,n-1} \cdot s^{n-1} - \ldots - A_{w,0})^{-1} B_w \cdot u(s),$$

wherein s is a Laplace variable, y(s) is a two-dimensional output vector, u(s) is a two-dimensional input vector, $A_{w,i}(w=1-p, i=n-1-0)$ is a 2×2 dimension unknown plant matrix, $B_w$ is the unknown input distribution matrix, and I is a 2×2-dimensional unit matrix); and said control input signal generating means includes a control input signal component generating means for generating components of the control input signal according to the relationships $$b_{est,11} = sign(b_{w,11}) |b_{w,11}|_{max},$$

$$b_{est,12} = sign(b_{w,21}) |b_{w,12}|_{max \text{ or } min},$$

$$b_{est,21} = sign(b_{w,21}) |b_{w,21}|_{max \text{ or } min},$$

$$b_{est,22} = sign(b_{w,22}) |b_{w,22}|_{max},$$

providing that component of j-column and k-row of $B_{est}$ and $B_w$ is represented by $b_{est,jk}$ and $b_{w,jk}$, respectively, the sign of "A" is defined as "sign(A)" and selection of a maximum value or a minimum value of b by which the absolute value of the determinant of $B_{est}$ becomes maximum is represented by $|b|_{max \text{ or min}}$.

4. The control system as in claim 1, further comprising:

first judgment means for determining whether control system tracking is within predetermined tolerances based on said error signals;

second judgement means for determining whether the control system is stable based on at least one of the error signals, the error signals said predetermined time period ago, said control signal, and said control signal said predetermined time period ago;

first parameter changing means for performing at least one of decreasing said control input signal, decreasing said predetermined time period, and increasing said error dynamics adjustment signal when output from said first judgment means indicates said control system tracking is outside said predetermined tolerances;

second parameter changing means for performing at least one of increasing the control input signal, increasing said predetermined time period, and decreasing said error dynamics adjustment signal when output from said second judgment means indicates instability; and priority means for effecting only the changes of said second parameter changing means when both said second and first parameter changing means make changes.

5. The control system as in claim 2, further comprising:

differential means for differentiating said control signal u(t);

first judgment means for determining whether control system tracking is within predetermined tolerances based on at least one of said error signals e(t) and the differentials of e(t);

second judgment means for determining whether the control system is stable based on at least one of the differentials of e(t), the differentials $de(t)/dt$—$d^{n-1} e(t)/dt^{n-1}$ of e(t) said predetermined time period L ago, the differential of said control signal, and the differential of said control signal said predetermined time period L ago;

first parameter changing means for performing at least one of decreasing $b_{est}$, decreasing L, and increasing $k_i$ when output from said first judgment means indicates said control system tracking is outside said predetermined tolerances;

second parameter changing means for performing at least one of increasing $b_{est}$, increasing L, and decreasing $k_i$ when output from said second judgment means indicates instability; and priority means for effecting only the changes of said second parameter changing means when both said second and first parameter changing means make changes.

6. The control system as in claim 5, wherein the first judgment means includes:

ratio determining means for determining a ratio of a time in which an absolute value of e(t) exceeds a first predetermined value to a second predetermined time period; and satisfaction means for determining that said control system tracking is outside said predetermined tolerances when said determined ratio exceeds a predetermined ratio.

7. The control system as in claim 5, wherein the second judgment means comprises:
   product means for generating a product signal based on the product between the differential value of e(t) and said differential value of e(t) said predetermined time period ago; and,
   stability means for producing a signal indicating instability when said product signal is less than a predetermined value.

8. The control system as in claim 5, wherein said first parameter changing means includes control input coefficient changing means for decreasing said control input coefficient $b_{est}$ based on at least one of the control input coefficients said predetermined time period ago, e(t), and the differential of e(t) when said control system tracking is outside predetermined tolerances, and for determining said control input coefficient $b_{est}$ as the control input coefficient said predetermined time period ago when said control system tracking is within said predetermined tolerances.

9. The control system as in claim 5, wherein said first parameter changing means includes a control coefficient changing means for decreasing said control input coefficient $b_{est}$ based on at least one of $b_{max}$, e(t) and the differential of e(t), when said control system tracking is outside said predetermined tolerances, and for determining said control input coefficient $b_{est}$ as $b_{max}$ when said control system tracking is within said predetermined tolerances.

10. The control system as in claim 5, wherein
    said first judgment means includes first fuzzy inference means for determining whether said control system tracking is outside said predetermined tolerances by fuzzy inference calculation of at least one fuzzy variable using e(t) and the differential of e(t); and
    said first parameter changing means includes second fuzzy inference means for decreasing said control input coefficient $b_{est}$ by fuzzy inference calculation using said fuzzy variable.

11. The control system as in claim 5, wherein said second parameter changing means includes decreasing means for decreasing $k_i$ when said control system tracking is outside said predetermined tolerances said predetermined time period ago and said second judgement means indicates instability.

12. A control system for a physical plant wherein the physical plant has a number of inputs, q, and the same number of outputs, modelled by the relationship $$y(s) = (s^n I - A_{w,n-1} \cdot s^{n-1} - \ldots - A_{w,0})^{-1} B_w u(s),$$

wherein s is a Laplace variable, y(s) is a q-dimensional output vector, u(s) is a q-dimensional input vector, $A_{w,i}$ (w=1—p, i=n−1—0) is q×q-dimensional unknown plant matrix, $B_w$ is a q×q-dimensional unknown input distribution, "I" is a q×q-dimensional unit matrix, "w" represents a number of operational points where (w=1,2—p, p being a predetermined number), and "n" is an integer; the control system comprising:
   reference state output production means for producing a reference output vector $y_m(t)$ of a reference model having q-inputs and q-outputs defined as $$y_m(s)/r(s) = (s^n + A_{m,n-1} \cdot s^{n-1} + \ldots + a_{m,0}) \cdot B_m^{-1} \cdot u(s),$$

and for producing differentials $dy_m(t)/dt$—$d^{n-1}y_m(t)/dt_{n-1}$ of said reference output vector provided that a coefficient matrix of said reference model is defined as $A_{m,i}$ (i=n−1—0), $B_m$ and an input vector of said reference model is defined as r(s), the reference output vector and differentials thereof representing a reference state of said physical plant;
   state output detection means for detecting an output vector y(t) of said physical plant and differentials $dy(t)/dt$—$d^n y(t)/dt^n$ of said output vector;
   error value production means for producing an error vector $e(t) = y_m(t) - y(t)$, and differentials $de(t)/dt$—$d^{n-1}e(t)/dt^{n-1}$ of said error vector;
   control signal generating means for generating a control signal u(t) from the relationship $$u(t) = u(t-L) + B_{est}^{-1}[-d^n y(t-L)/dt^n - A_{m,n-1} \cdot d^{n-1} y(t)/dt^{n-1} - \ldots$$
$$- A_{m,0} \cdot y(t) + B_m \cdot r(t) + K_{n-1} \cdot d^{n-1} y(t)/dt^{n-1} + \ldots$$
$$+ K_0 \cdot e(t)]$$

where L is a predetermined time period, $K_i$ (i=n−1—0) is a q×q-dimensional error dynamics adjustment matrix, the desired error dynamics adjustment matrix being defined by the relationship
   $d^n e(t)/dt^n = -(A_{m,n-1} + K_{n-1}) \cdot d^{n-1} e(t)/dt^{n-1} - \ldots -(A_{m,0} + K_0) \cdot e(t)$,
   and $B_{est}$ is a control input matrix, said control signal generating means including:
      control input matrix generating means for generating said control input matrix $B_{est}$ such that entire coefficients with respect to "s" are positive in a characteristic relationship determined from the relationship $\det\{(2B_{est} \cdot B_w^{-1} - I) Ls + 2I\}$, and
      error dynamics adjustment matrix generating means for generating said error dynamics adjustment matrix, the coefficient matrix of said reference model and said predetermined time period L so that the relationships $$L << 2/|2B_{est}B_w^{-1} \cdot A_{w,n-1} + A_{m,n-1} + K_{n-1}|_{max},$$

$$L << 2/|(2B_{est}B_w^{-1} - I) \cdot (A_{m,n-1} + A_{m,n-1} + K_{n-1})|_{max},$$

$$L << 2|A_{m,i} + K_1|_{min}/|2B_{est}B_w^{-1} \cdot A_{w,i-1} + A_{m,i-1} + K_{i-1}|_{max},$$

$$L << 2|A_{m,i} + K_1|_{min}/|(2B_{est}B_w^{-1} - I)(A_{m,i-1} + K_{i-1} + K_{i-1}|_{max},$$

$$L << 2/\omega_o,$$

$$L << 2/|(B_{est}B_w^{-1} - I)|_{max}\omega_o,$$

are satisfied with respect to every "i" from n−1 to 1, where $|A_{m,i} + K_i|_{min}$ is a minimum absolute value of a component of a matrix $A_{mi} + K_i$ except for a zero component of said matrix $A_{m,i} + K_i$, and $\omega_o$ is a frequency range which is required for tracking said reference state; and
   control signal application means for controlling said physical plant in accordance with said control signal u(t).

* * * * *